United States Patent
McEntee

(10) Patent No.: US 10,177,978 B2
(45) Date of Patent: *Jan. 8, 2019

(54) COMMUNITY INTERNET DRIVE

(71) Applicant: PLANETARY DATA LLC, Encinitas, CA (US)

(72) Inventor: Robert Alan McEntee, Encinitas, CA (US)

(73) Assignee: Planetary Data LLC, Encinitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/713,351

(22) Filed: Sep. 22, 2017

(65) Prior Publication Data
US 2018/0013621 A1    Jan. 11, 2018

Related U.S. Application Data

(63) Continuation of application No. 14/249,228, filed on Apr. 9, 2014, now Pat. No. 9,800,464, which is a
(Continued)

(51) Int. Cl.
*H04L 12/24* (2006.01)
*H04L 29/08* (2006.01)
(Continued)

(52) U.S. Cl.
CPC ......... *H04L 41/0813* (2013.01); *G06F 13/00* (2013.01); *G06F 17/3023* (2013.01);
(Continued)

(58) Field of Classification Search
CPC ............. H04L 41/0813; H04L 67/1095; H04L 67/1097; H04L 67/20; H04L 67/306;
(Continued)

(56) References Cited

U.S. PATENT DOCUMENTS 5,727,156 A    3/1998   Herr-Hoyman et al.
5,864,874 A    1/1999   Shapiro
(Continued)

FOREIGN PATENT DOCUMENTS

WO    WO 2005/079018 A1    8/2005
WO    WO-2005079018 A1 *  8/2005    ......... H04L 12/1822
(Continued)

OTHER PUBLICATIONS

PCT International Search Report for PCT/US2012/020094 dated May 1, 2012.
(Continued)

*Primary Examiner* — Uzma Alam
(74) *Attorney, Agent, or Firm* — Alston & Bird LLP

(57) ABSTRACT

Provided herein are devices, systems, methods and various means, including those related to providing a community internet drive that may utilize a centrally-managed hub as well as storage devices distributed among various networked machines. In some embodiments, the community internet drive can also include features to enable its users to promote and utilize the user's trusted personal relationships while also enabling an open platform for peer-to-peer and/or other types of sharing schemes.

21 Claims, 19 Drawing Sheets

Related U.S. Application Data continuation of application No. 13/342,836, filed on Jan. 3, 2012, now Pat. No. 8,738,725.

(60) Provisional application No. 61/429,252, filed on Jan. 3, 2011.

(51) Int. Cl.
*G06F 21/62* (2013.01)
*G06F 13/00* (2006.01)
*G06F 17/30* (2006.01)
*H04L 29/06* (2006.01)

(52) U.S. Cl.
CPC .... *G06F 17/30864* (2013.01); *G06F 21/6218* (2013.01); *H04L 67/1095* (2013.01); *H04L 67/1097* (2013.01); *H04L 67/20* (2013.01); *H04L 63/104* (2013.01); *H04L 67/306* (2013.01)

(58) Field of Classification Search
CPC ................ G06F 13/00; G06F 17/3023; G06F 17/30864; G06F 21/6218
See application file for complete search history.

(56) References Cited

U.S. PATENT DOCUMENTS

| | | | |
|---|---|---|---|
| 5,873,085 A | 2/1999 | Enoki et al. | |
| 5,909,540 A | 6/1999 | Carter et al. | |
| 5,913,217 A | 6/1999 | Alger et al. | |
| 5,918,229 A | 6/1999 | Davis et al. | |
| 5,987,506 A | 11/1999 | Carter et al. | |
| 6,047,332 A | 4/2000 | Viswanathan et al. | |
| 6,061,773 A * | 5/2000 | Harvey | G06F 12/1036 711/206 |
| 6,173,293 B1 | 1/2001 | Thekkath et al. | |
| 6,415,280 B1 | 7/2002 | Farber et al. | |
| 6,556,998 B1 | 4/2003 | Mukherjee et al. | |
| 6,625,604 B2 | 9/2003 | Muntz et al. | |
| 6,754,696 B1 * | 6/2004 | Kamath | G06F 17/30067 707/999.003 |
| 6,892,245 B1 | 5/2005 | Crump et al. | |
| 6,938,169 B1 * | 8/2005 | Caronni | G06F 17/30067 380/33 |
| 6,952,737 B1 | 10/2005 | Coates et al. | |
| 7,024,427 B2 | 4/2006 | Bobbitt et al. | |
| 7,043,637 B2 | 5/2006 | Bolosky et al. | |
| 7,062,490 B2 | 6/2006 | Adya et al. | |
| 7,062,648 B2 | 6/2006 | Moulton et al. | |
| 7,068,666 B2 * | 6/2006 | Foster | H04L 49/357 370/397 |
| 7,171,491 B1 * | 1/2007 | O'Toole | H04L 12/185 709/218 |
| 7,177,912 B1 | 2/2007 | Ignatoff et al. | |
| 7,181,536 B2 | 2/2007 | Burbeck et al. | |
| 7,401,220 B2 | 7/2008 | Bolosky et al. | |
| 7,433,876 B2 | 10/2008 | Spivack et al. | |
| 7,516,199 B2 | 4/2009 | Saika | |
| 7,546,353 B2 | 6/2009 | Hesselink et al. | |
| 7,567,987 B2 | 7/2009 | Shappell et al. | |
| 7,672,945 B1 * | 3/2010 | Chatterjee | G06F 17/30997 707/999.009 |
| 7,689,715 B1 | 3/2010 | Slaughter et al. | |
| 7,734,817 B2 | 6/2010 | Teodoslu et al. | |
| 7,869,383 B2 | 1/2011 | Tabbara et al. | |
| 8,181,182 B1 * | 5/2012 | Martin | G06F 9/485 709/226 |
| 8,438,633 B1 * | 5/2013 | Backholm | G06Q 30/06 726/17 |
| 8,462,665 B2 * | 6/2013 | Tabbara | G06Q 30/06 370/229 |
| 8,738,725 B2 | 5/2014 | McEntee | |
| 8,793,334 B1 * | 7/2014 | Bathija | H04L 67/1097 707/821 |
| 8,935,307 B1 * | 1/2015 | Srinivasan | G06F 17/30194 707/827 |
| 9,800,464 B2 | 10/2017 | McEntee | |
| 2002/0038296 A1 | 3/2002 | Margolus et al. | |
| 2002/0091975 A1 * | 7/2002 | Redlich | G06F 21/6218 714/699 |
| 2002/0097278 A1 | 7/2002 | Mandler et al. | |
| 2002/0120638 A1 | 8/2002 | Boehmke | |
| 2002/0128995 A1 * | 9/2002 | Muntz | G06F 17/30067 |
| 2002/0184311 A1 | 12/2002 | Traversat et al. | |
| 2002/0188657 A1 | 12/2002 | Traversat et al. | |
| 2004/0068563 A1 * | 4/2004 | Ahuja | G06F 9/52 709/225 |
| 2004/0133629 A1 | 7/2004 | Reynolds et al. | |
| 2004/0139098 A1 | 7/2004 | Margolus et al. | |
| 2004/0139303 A1 | 7/2004 | Margolus et al. | |
| 2004/0143578 A1 | 7/2004 | Margolus et al. | |
| 2004/0143744 A1 | 7/2004 | Margolus et al. | |
| 2004/0143745 A1 | 7/2004 | Margolus et al. | |
| 2004/1014374 | 7/2004 | Margolus et al. | |
| 2004/0162808 A1 | 8/2004 | Margolus et al. | |
| 2004/0210582 A1 * | 10/2004 | Chatterjee | G06F 17/30575 |
| 2004/0255140 A1 | 12/2004 | Margolus et al. | |
| 2005/0050227 A1 | 3/2005 | Michelman | |
| 2005/0131905 A1 | 6/2005 | Margolus et al. | |
| 2005/1013196 | 6/2005 | Margolus et al. | |
| 2005/0172124 A1 | 8/2005 | Carpentier et al. | |
| 2005/0228948 A1 | 10/2005 | Mikuma et al. | |
| 2005/0246393 A1 | 11/2005 | Coates et al. | |
| 2007/0143546 A1 * | 6/2007 | Narad | G06F 12/084 711/130 |
| 2008/0077635 A1 * | 3/2008 | Sporny | G06F 17/30206 |
| 2008/0259798 A1 * | 10/2008 | Loh | H04L 45/302 370/235 |
| 2009/0106434 A1 | 4/2009 | Zirbel et al. | |
| 2009/1024073 | 9/2009 | Hardisty et al. | |
| 2009/0271412 A1 * | 10/2009 | Lacapra | G06F 17/30206 |
| 2010/0023722 A1 * | 1/2010 | Tabbara | H04L 43/00 711/170 |
| 2010/0161752 A1 | 6/2010 | Collet et al. | |
| 2011/0078377 A1 * | 3/2011 | Grube | A63F 13/12 711/118 |
| 2011/0196900 A1 * | 8/2011 | Drobychev | G06F 17/30575 707/812 |
| 2011/0246652 A1 * | 10/2011 | Tabbara | G06Q 30/06 709/226 |
| 2011/0289514 A1 * | 11/2011 | Augustine | G06F 9/526 719/316 |
| 2012/0023309 A1 * | 1/2012 | Abraham | G06F 11/00 712/30 |
| 2012/0084386 A1 * | 4/2012 | Fu | G06F 9/5072 709/214 |
| 2012/0110572 A1 * | 5/2012 | Kodi | G06F 9/45558 718/1 |
| 2012/0166576 A1 * | 6/2012 | Orsini | G06F 11/1471 709/217 |
| 2012/0173673 A1 * | 7/2012 | Dietrich | G06F 17/30206 709/218 |
| 2012/0271908 A1 * | 10/2012 | Luna | G06F 9/5016 709/216 |
| 2012/0303685 A1 * | 11/2012 | Ulrich | G06F 3/061 707/827 |
| 2012/0311339 A1 * | 12/2012 | Irvine | H04L 63/0407 713/176 |
| 2013/0166669 A1 * | 6/2013 | Luna | G06F 9/5016 709/212 |
| 2014/0040755 A1 * | 2/2014 | Momchilov | G06F 9/54 715/740 |

FOREIGN PATENT DOCUMENTS

| WO | WO 2010/011968 A2 | 1/2010 |
|---|---|---|
| WO | WO 2012/094330 A1 | 7/2012 |

(56) References Cited

FOREIGN PATENT DOCUMENTS

OTHER PUBLICATIONS

PCT Written Opinion of the International Searching Authority PCT/US2012/020094 dated May 1, 2012.
PCT International Preliminary Report on Patentability PCT/US2012/020094 dated Jul. 10, 2013.
U.S. Appl. No. 13/342,836, Non-Final Office Action dated Aug. 15, 2013.
U.S. Appl. No. 13/342,836, Notice of Allowance dated Mar. 3, 2014.
U.S. Appl. No. 14/249,228, Final Office Action dated May 13, 2016.
U.S. Appl. No. 14/249,228, Non-Final Office Action dated Mar. 26, 2015.
U.S. Appl. No. 14/249,228, Non-Final Office Action dated Nov. 3, 2016.
U.S. Appl. No. 14/249,228, Non-Final Office Action dated Nov. 5, 2015.
U.S. Appl. No. 14/249,228, Notice of Allowance dated Jun. 21, 2017.

* cited by examiner

COMMUNITY INTERNET DRIVE

CROSS REFERENCE TO RELATED APPLICATION

This application is a continuation of U.S. patent application Ser. No. 14/249,228, titled "Community Internet Drive," filed Apr. 9, 2014, which is a continuation of U.S. patent application Ser. No. 13/342,836, titled "Community Internet Drive," filed Jan. 3, 2012, which claims the benefit of and is a non-provisional application of U.S. Provisional Application No. 61/429,252, filed Jan. 3, 2011, the contents of which are incorporated by reference herein in their entirety.

FIELD

Embodiments of the present invention relate generally to network storage systems and, more particularly, relate to methods, apparatuses, computer readable media, systems and other means for providing data storage management.

BACKGROUND

Embodiments of the present invention are directed to network storage and other systems for processing, storing and transferring data, such as those used to create a limited virtual file system (VFS), inclusive of peer-to-peer (P2P) data transfers for community use. A number of deficiencies and problems associated with conventional data storage and transfer processes and systems have been identified. Through applied effort, ingenuity and innovation, solutions to many of these identified problems have been solved by developing systems, computer readable media, methods, apparatuses and other means that are included in various embodiments of the present invention, some examples of which are detailed below.

BRIEF DESCRIPTION OF THE SEVERAL VIEWS OF THE DRAWINGS

Reference will now be made to the accompanying drawings, which are not necessarily drawn to scale, and wherein.

SUMMARY

Figure 1A:
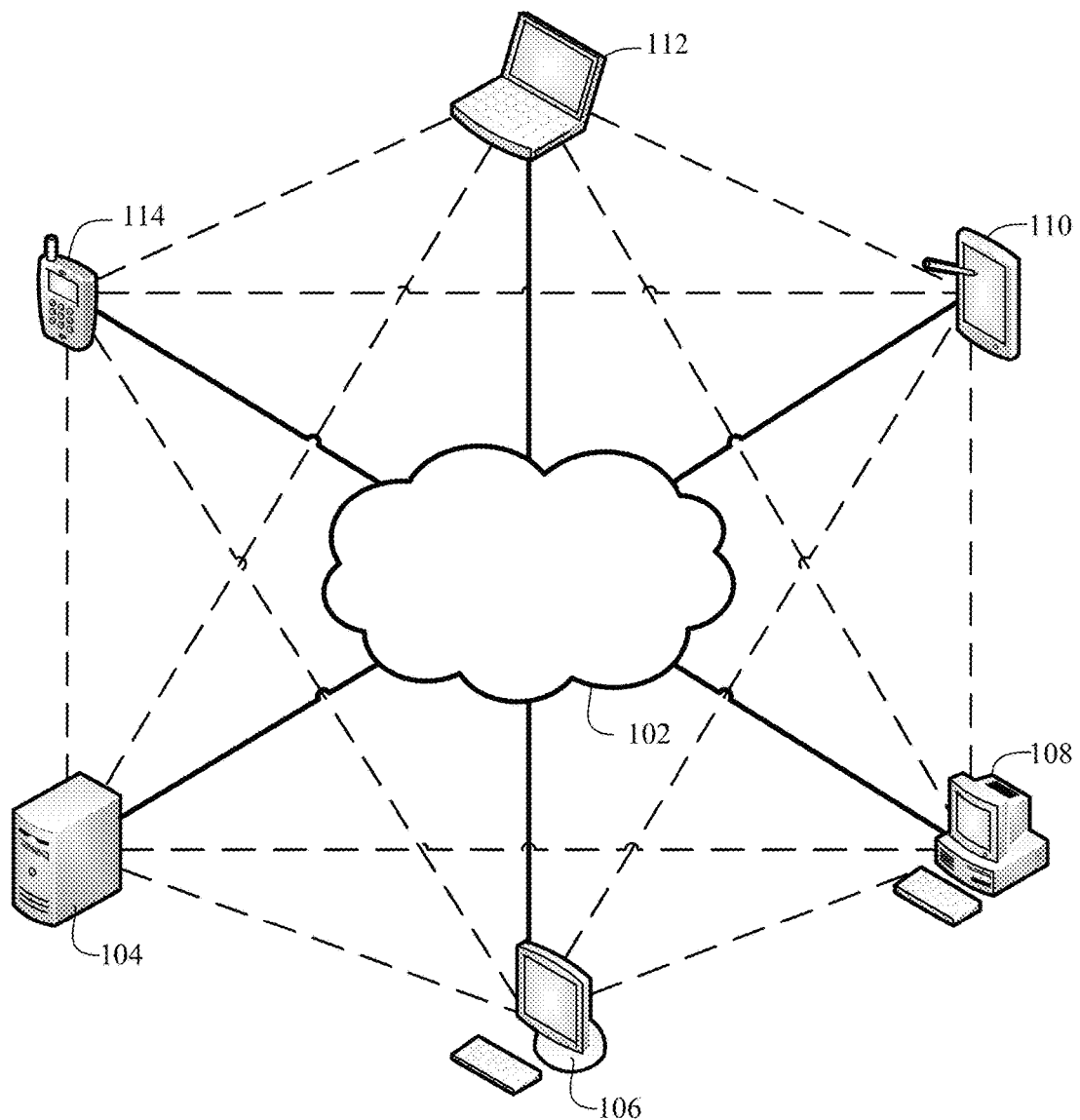
FIGS. 1A-1B show example systems, apparatuses and hardware comprising machines in accordance with some embodiments discussed herein.

Embodiments include systems, apparatuses, methods, computer readable media and other means for providing, among other things, a community internet drive having data storage, distributed data management and/or social networking functionality, and providing a virtual file system across potentially heterogeneous devices. Some users may be "members" of the "community" meaning that these users have opted-in to using the community internet drive. The community internet drive may be built from various "community machines" maintained and controlled by members of the community internet drive. The community machines may be networked together (e.g., using the Internet and/or other networks) to virtually connect all their personal hard drives (or at least a portion thereof) into one or more virtual drives that may each have a size that scales with the size of the community. At least some of the community machines may be computers, tablets, and/or other machines that are designed to be used predominately for personal and/or non-commercial purposes by their users (such as, e.g., desktop computers, laptop computers, smart phones, etc.), as opposed to commercial-grade servers and databases often used to implement cloud-computing functionality. As such, there may be no barrier to connecting hundreds, thousands, millions, and/or billions of individual drives, providing in aggregate exabytes, zettabytes, or any other amount of data for the community internet drive.

For example, in some embodiments, a first user machine, such as a personal computer, tablet or smart phone, can be configured to generate a request to be included in the community internet drive. The request can be transmitted to a remote machine, such as a server and/or other machine that is configured to function as a managed hub. The first user machine can then receive configuration data from, for example, the remote machine. In some embodiments the configuration data may come from another user machine via a direct connection, such as those sometimes used for peer-to-peer communications (as opposed to client-server communications).

The first user machine can then be configured to execute the configuration data, including partitioning its local storage device into a private portion and a shared portion. This partitioning may be performed by enabling the first use of the first machine to select one or more local directories (e.g., one or more folders included in the first computer's hard drive) to be mounted (e.g., or otherwise added to) the community internet drive. While the local directories that are mounted to the community internet drive can be considered "a shared portion" of the first machine's local storage device, other directories that are not mounted to the community internet drive can be considered the private portion of the local storage device that is excluded from the community internet drive.

Additionally (or alternatively), some embodiments discussed herein provide various solutions to problems related to sharing data between or among users. For example, the managed hub can be configured to cause data to be transferred to a person or place where it is needed.

Each user may also identify other users in particular and/or criteria for selecting other users to define a user-selected subset community within the larger community. For example, within a certain user base of the self-selected community, embodiments discussed herein can manage the sharing of data according to the social mapping of the user-selected subset community, while it also feeds the development of the larger community with user-generated content ("UGC"). Embodiments may also be easy to use, provide data security, be fair, be reliable, and provide benefit through the enabled quality of service. Data from user's "in-group" can be inherently more interesting than that published by strangers.

As used herein, a user's "in-group" may include one or more other users that the user has identified (in the user's profile and/or otherwise) as having a relationship with, such as a friendship, family relationship, business relationship, and/or any other type(s) of relationship. Some types of in-group relationships may require the other user to accept a request to be in the group. For example, a first user may indicate that a second user is a friend and include the second user's email address in the user's profile, but the second user may not be considered a "friend" of the first user by the system until the second user indicates or otherwise confirms that first user is in fact a friend (e.g., by affirmatively accepting the first user's friendship and/or by not denying the friendship request within a given period of time).

For example, an in-group may be created by a user machine or be created by the managed hub in response a user machine providing data for a user profile associated with a user. The first user profile can be configured to include data related to, for example, the user personal information, the user's machines and/or the user's social networks. For example, the user profile may include the user's birthday, username, address, credit card information, lap top's internet protocol ("IP") address, cellular phone's IP address, FaceBook username/password, the user's email address, a friend's email address, a business partner's email address, etc. The friend's email address, business partner's email address and/or FaceBook information can be used to then create one or more in-groups (such as a friends' group, family group, business group, and/or any other type of group). The first user profile can then be provided to the remote machine (such as, e.g., a server functioning as the managed hub).

While the first user machine can be configured to store user data (e.g., files, pictures, movies, websites, and/or other content associated with the first user) in the first user machine's shared portion of the local storage device, all the user data can be encrypted such that only machines associated with in-group users can access the user data. For example, the first user machine may also receive and store a stranger's user data (because the first user machine is part of the community internet drive), but if the stranger user is unassociated with any of the user's in-group(s), the stranger's user data can be encrypted such that the first user machine is unable to decipher the stranger's user data despite the stranger's data being physically stored on the user's computer (e.g., in the local portion of the local storage device).

In accordance with some embodiments, published drive contents can have uniform resource identifiers (URIs) constructed from the Uniform Resource Locator (URL) of the community internet drive (such as, e.g., w3disk.com). Drive contents can be linked to similar to or the same as a website is linked to, and drive contents and/or community websites can operate with features similar to a local and/or networked disk drive and/or other storage device. For example, opening links to folders can include displaying directory listings, and opening links to files can include showing the file details. Each user can be enabled by the system to register a namespace. In some embodiments, namespaces may be organized and structured for usability and value, where higher value namespaces can indicate something about the language of posted content, geographic location of the community member, business area or an associated internet domain, any subject domain where specialized content will be aggregated, and/or naming of personal relevance to the user.

In some embodiments, URI construction can include creating an identifier to an instance of data. The URI can be unique in the sense of identifying one exact instance of data on one particular community machine, but it can be possible to generate more than one URI to that instance of data in some embodiments. In other words, in some embodiments, the URI may not guarantee there are not multiple copies of the data, or that another different URI may not be pointing to an identical copy, or that contents do not change over time. This differs from other types of URIs/UUIDs that may be unique and one-to-one based on file contents, or that are designed to identify the same logical file entity even as it passes through revisions.

The centralized management functionality of the community internet drive may be provided by a managed hub, which may be implemented in hardware, firmware and/or software. The managed hub can configure systems to inspect the URI and/or route the request to connect some number of community machines as peers to satisfy the request. The managed hub can also be configured to track duplicates (through, e.g., metadata comparisons, direct file or data inspection, and/or simply tracking associations generated from past successful copy events, among other ways). Each copy made is traceable to the progenitor of initial introduction to the community internet drive, and each duplicate can potentially be used as another available peer.

Adding a central hub (such as a networked server and/or database) to a peer-based community internet drive can enable additional services and functionality that may not be available in a purely peer-to-peer-based system or in a purely cloud-based system. The central hub can, for example, track access control lists (ACLs) and in-group lists to restrict consumer views even when the publisher is offline. The central hub can also be configured to protect the publisher's data and IP addresses by checking access permissions before connecting peers. As yet another example, the central hub can also manage individual point-to-point connections, where the "publisher" (the community member publishing data to the community internet drive) provides keys to specific individuals for specific data or files. The central hub can also be configured to control the namespace to protect against infringement. In some embodiments, the central hub can also or instead be configured to manage encryption and file splitting (even below the byte level in some embodiments), so that backups and duplicates are not readable by the backup host, but using hub information the files can be reconstructed at the authenticated "consumer" (e.g., the user receiving and/or otherwise accessing the data provided by the publisher), even when multiple blind hosts are the only sources uploading the content. In some embodiments, only the authenticated downloader may be given enough information to reconstruct the original file. The central hub can also be configured to gate access to services provided to various types of users and/or enforce fairness among users. As used herein, "fairness" includes is giving a user access proportional to the user's level of participation. For example, fairness can cause a particular user to receive expanded or diminished services compared to those provided by the central hub to other users. For user satisfaction, the user can also be able to use the system to prioritize how the user's service credits are applied, such as the number of redundant backups of particular files of the user, and/or the number of uploading peers activated as they download.

The hub can persist or cache data and files from community members for efficiency and reliability on other community members' machines. The hub can persist metadata about published materials for better exposure to searching. The hub can improve reliability by delivering duplicate or derivative files when the original is unavailable. The hub can persist user preferences for how pages under their mount point display, including but not limited to background images, fonts, styles, and messages. The hub can provide commerce features, where community members set a price for any of their published content.

Although some embodiments of the managed hub may include both the central hub and/or control functionality distributed among community machines under the control of community members, other embodiments can provide greater or lesser services when the central hub is not functional, has reduced functionality, and/or is omitted from the system altogether. As such at least some of the functionality discussed herein can be implemented by an exclusively peer-based managed hub. An exclusive, peer-based managed hub however may not have complete or up-to-date published directories for offline community members.

Other than providing a framework of central hub pages and container pages where mount points are listed, the rest of the contents of the virtual community internet drive are data driven. The users as independent publishers control their mount point, and any files or data they drop into the hierarchy of subdirectories under their mount point. As they drop in files, the drive grows. As they add messages, metadata, previews, and any other descriptive content, the content becomes richer and more discoverable.

Additionally, some embodiments may include a first user machine being further configured to access decrypted data associated with another user whose machines publish data. The first user machine can be further configured to receive a notification that the other user machine has accepted an invitation to be in the group with the first user machine prior to the first user machine being configured to access the decrypted data associated with the second user. The first user machine can be further configured to send the second user machine a notification in response to new data being added, by the first machine, to the shared portion of the first machine's local storage device.

The system can also be configured to maintain control over namespaces. In response to a user machine, such as an independent publisher, requesting control of a namespace from the server and/or other managed hub, the independent publisher may receive control of the namespace from the remote machine. In some embodiments, a fee may be charged for various premium namespaces before control is awarded to an independent publisher.

Some embodiments also include a system and/or method of managing data among a plurality of machines, comprising: receiving a first request from a first machine to join a community internet drive managed at least partially by a remote machine, wherein whether the first machine is online is dependent on a first user; in response to receiving the first request, transmitting data initiating the configuration of the first machine to be part of the community internet drive; receiving a second request from a second machine to join the community internet drive managed at least partially by the remote machine; in response to receiving the second request, transmitting data initiating the configuration of the second machine to be part of the community internet drive; receiving a third request from a third machine to join the community internet drive managed at least partially by the remote machine; in response to receiving the third request, transmitting data initiating the configuration of the third machine to be part of the community internet drive; receiving an indication of first data associated with the first machine to be stored in the community internet drive, wherein the first data is encrypted; and in response to receiving the indication of the first data: causing at least a first portion of the first data, as encrypted, to be stored on the second machine, wherein the second machine is unable to decrypt the first data and wherein whether the second machine is online is under the control of a second user that is different than the first user; and causing at least a second portion of the first data, as encrypted, to be stored on the third machine, wherein the third machine is unable to decrypt the first data and wherein whether the third machine is online is under the control of a third user that is different than the first user and the second user.

Further, the method can comprise generating profile information associated with the first user of the first machine; determining from the profile information that the first machine is associated with the first user; determining a fourth machine is associated with a fourth user, wherein the first user has indicated in the profile information that the fourth user is in a group authorized to access the first data; and enabling the fourth machine to access the first data as unencrypted.

In some embodiments, the method can also comprise: receiving a request from the fourth machine to access the first data; determining the fourth machine is authorized by the first user to access the first data; in response to receiving the request, determining the first machine is offline; in response to determining the first machine is offline, determining the second machine and the third machine are online; and in response to determining the second machine and the third machine are online, enabling the first data to be transferred from the second machine and the third machine to the fourth machine.

A determination can be made that the fourth machine has accessed and downloaded a first copy of the first data. Then a determination can be made whether the fourth machine has modified the first copy of the first data; and in response to determining the copy of the first data is unmodified by the fourth machine, progenitor data can be generated that is associated with the first copy indicating the first copy is substantively identical to the first data. In response to determining the copy of the first data was modified by the fourth machine, progenitor data can be generated that is associated with the first copy indicating the first copy is a modified version of the first data.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Some embodiments discussed herein can be used as a community internet drive. For example, system 100 shown in FIG. 1A can be configured to leverage and/or otherwise integrate storage devices across a heterogeneous set of machines and operating systems into one cohesive whole using various network infrastructure. In some embodiments, data from one or more storage devices, or even every storage device in the network community of system 100, can be transferred and shared as in a single virtual file system. In combination, the processing and features bundled as discussed herein can create a powerful and useful tool that is relatively easy to use for solving long standing problems with enabling data sharing and availability among various machines.

For example, system 100 can include network 102, which may comprise the public Internet, private network(s), cellular network(s), direct connection(s), and/or satellite network(s), among other types of networks. The direct connections may be any suitable type of connection, such as one or more wired connections (e.g., a universal serial bus ("USB") connections, Ethernet connections, etc.) and/or wireless connections (e.g., a BlueTooth® connections, WiFi connections, etc.). As such, network 102 may include, for example, one or more servers, switches, routers, processors and/or other hardware configured to facilitate the transmission of data and/or aid in providing the other functionality discussed herein, including that related to the management and storage of data on various storage devices.

While network 102 may include various servers, etc., FIG. 1A also shows server 104, which may in-and-of-itself comprise one or more servers, databases, and/or other machines used to provide management related functionality of data maintained on the distributed, heterogeneous storage devices, sometimes referred to herein as "independent publishers." Server 104 may also be configured to provide, for example, cloud-computing functionality (or something similar thereto), virtual file system functionality (or something similar thereto) and/or social networking functionality (or something similar thereto), among other things. In other words, server 104 may be configured to be and/or otherwise implement the functionality associated with the managed hub discussed herein, which may be the aggregate of processes, such as those discussed in connection with FIGS. 6-11, and in some embodiments can include a centralized framework based on one or more networked servers.

In this regard, server 104 may aid in coordinating communications, data transfers, user profile permissions, and/or any other type of management functionality related to the distributed storage devices included in the community internet drive. As noted above, the distributed storage devices used to form the community internet drive may be included in one or more user machines, sometimes referred to herein as independent publishers, some examples of which are computer 106, personal computer 108, tablet 110, laptop computer 112, and/or cellular device 114, among others (such as gaming consoles, etc.).

Example circuitry that may be included in one or more of server 104, computer 106, personal computer 108, tablet 110, laptop computer 112, and/or cellular device 114, is discussed in connection with FIG. 1B. Server 104, computer 106, personal computer 108, tablet 110, laptop computer 112, and/or cellular device 114, among others, are each sometimes referred to herein as a "community machine" as each can be part of some embodiments of the community internet drive discussed herein.

In some embodiments, the managed hub can be implemented in a decentralized fashion, rather than being consolidated in server 104. For example, the managed hub functionality can be provided by any and/or all of the community machines operating collectively. Hence, at least some embodiments may include a decentralized framework based on one or more networked servers, computers, cellular devices, tablets, and/or other machines.

The solid lines between the network 102 and each of the community machines represent centrally managed connections (such as, e.g., broadband connections) that can be predominately used for control and reporting communications flow in accordance with some embodiments discussed herein. The dashed lines of FIG. 1A between various community machines represent connections for peer-to-peer (P2P) communications (e.g., connections between two machines that are considered peers as opposed to connections between a client and server) in accordance with some embodiments discussed herein, with the peer-to-peer communications predominately designated for data transfers. While the centrally managed hub and P2P communications can exist in isolation and be implemented individually, when implemented collectively, the peer-to-peer communications are assembled to create a virtual file system.

In some embodiments, P2P and/or centrally managed connections can be used to facilitate the transfer of any type of data, such as, e.g., data about system status and operations, among other things. In this regard, system 100 may enable "trusted peer machines" included in the community of machines, to elect to share contents and descriptive information from their local drives with each other directly and with others in the community. As referred to herein, "trusted peer machines" refers to community machines that are under control of an authenticated community member who makes their machine open for storing and sharing community data. It follows that the community internet drive is comprised of storage devices, or portions thereof, of various community machines that are used to store data for the trusted peer machines of system 100, and that function to securely disseminate data between authorized members.

The managed hub of system 100 can be a virtually centralized hub of various processes executed by system 100. For example, the managed hub can allow system 100 to be configured to, for example, collectively manage the namespace used by the community machines of system 100, distribute tasks performed by the community machines of system 100, track and report statuses of community machines included in system 100, and/or present a unified view of the virtual file system provided by the community internet drive distributed among the community machines of system 100, among other things.

Figure 1B:
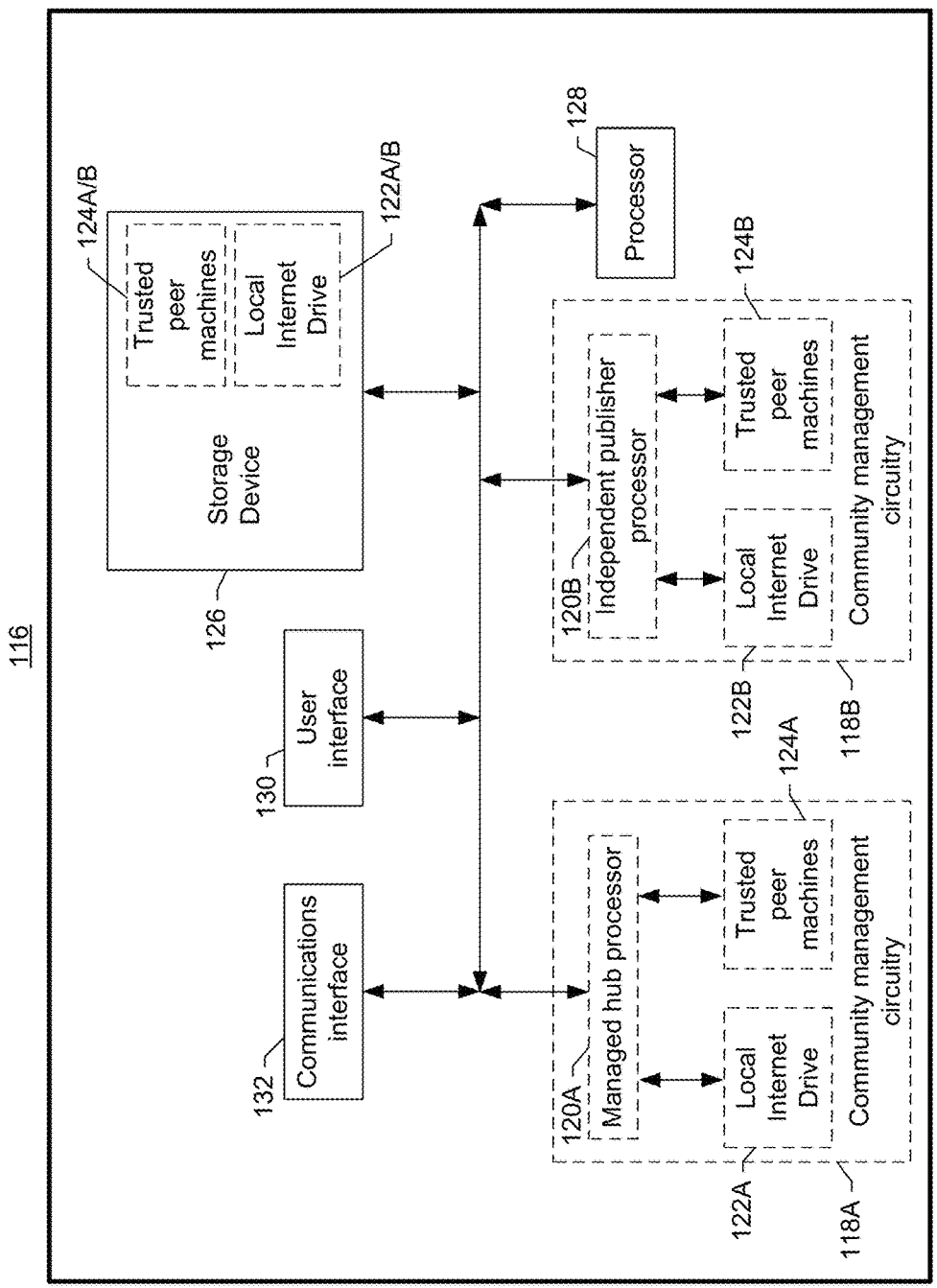

FIG. 1B shows circuitry, logic, and other components that may be included in community machine 116 in accordance with some embodiments discussed herein. Community machine 116 is shown as a generic example of a community machine and the components and functionality discussed in connection with community machine 116 may also be included in or otherwise provided by one or more other machines or other types of apparatuses, such as server 104, computer 106, personal computer 108, tablet 110, laptop computer 112, and/or cellular device 114. Although community machine 116 is generally discussed in connection with the machines included in system 100 shown in FIG. 1A, a variety of other devices (such as, for example, an email server, proxy, other type of user device (such as network-attached storage device and/or gaming console), and/or any other type(s) of networked device) may provide some or all of the components and/or functionality discussed in connection with FIG. 1B. Also, community machine 116 may include one or more additional components and/or components shown in FIG. 1B may be combined or divided without departing from the spirit of the invention.

For example, the elements of community machine 116 can be used to provide the managed hub, or at least a portion thereof. A combination of community machines may be configured to work with one or more other community machines, such as those shown in FIG. 1A, to provide the managed hub and/or other services and functionalities discussed herein. At least some of the other community machines may include at least some of the same or similar components as discussed in connection with community machine 116. Alternatively or additionally, the circuitry and other components discussed in connection with FIG. 1B may be employed within a combination of apparatuses or other types of machines. Accordingly, some embodiments of the present invention may be embodied wholly at a single device and/or by devices networked together. Furthermore, it should be noted that the devices and/or other elements described herein may not be mandatory and thus some may be omitted in certain machines of various embodiments.

One or more of the community machines may include or otherwise be in communication with community management circuitry 118A that is configured to perform data transfer, processing, application execution and other processing associated with the distributed data storage and management functionality discussed herein. Community management circuitry 118A may include managed hub processor 120A and one or more storage devices, such as local internet drive 122A and/or trusted peer machines memory 124A (discussed below). Local internet drive 122A and/or trusted peer machines memory 124A may be used facilitate various features provided by some embodiments discussed herein.

For example, local internet drive 122A can be included in a particular community machine and be configured to support managed hub functionality of system 100's community internet drive. As such, local internet drive 122A may be configured to store community data, including data provided by and associated with one or more of the other, remotely-located community machines, data used to implement the managed hub, and associated shared and communal data for the virtual file system the local machine is configured to share with other community machines, among other kinds of data.

Trusted peer machines memory 124A can be configured to store data associated with other community machines, including data that identifies (e.g., IP address information of) the machines that are included in the community of machines, data that identifies which of the community machines is utilizing local internet drive 122A of community machine 116, data that identifies which of the community machines is authorized to utilize local internet drive 122A, and data that identifies which of the community machines is prohibited from utilizing local internet drive 122A, among other things. There can be a variety of trusted relationships and levels, on both the publishing and consuming side, which the managed hub may aid in maintaining, managing and/or otherwise facilitating. On the publishing side a community machine can have a level of trust as a content provider either by establishing a community rating or based on the personal relationship between the members. On the consuming side, either individuals or members of a defined in-group (such as friends and family) can be granted read and/or write access to content.

Community management circuitry 118A and/or managed hub processor 120A may be embodied in a number of different ways. For example, managed hub processor 120A may be embodied as various processing means such as a microprocessor or other processing element, a coprocessor, a controller or various other computing or processing devices including integrated circuits such as, for example, an ASIC (application specific integrated circuit), an FPGA (field programmable gate array), or the like. In some example embodiments, managed hub processor 120A may be configured to execute instructions, such as those discussed in connection with FIGS. 6-11, stored in storage device 126 or other storage device(s), such as local internet drive 122A and/or trusted peer machines memory 124A, that is otherwise accessible to managed hub processor 120A. As such, whether configured by hardware, firmware and/or software, or by a combination thereof, managed hub processor 120A and/or community management circuitry 118A may represent an entity (e.g., physically embodied in circuitry hardware) capable of performing operations according to embodiments of the present invention while configured accordingly. Thus, for example, when managed hub processor 120A is embodied as an ASIC, FPGA or the like, managed hub processor 120A may be specifically configured hardware for conducting the operations described herein, including those discussed in connection with FIGS. 6-11. Alternatively, as another example, when managed hub processor 120A is embodied as an executor of software instructions, the instructions may specifically configure managed hub processor 120A to perform the operations described herein. Regardless of how managed hub processor 120A is embodied, it may be configured to work with other managed hub processors, independent publisher processors and/or any other type of circuitry that may be included in one or more other community devices embodied in the same and/or different forms.

In some embodiments, community machine 116 may instead or also be configured to function as an independent publisher. For example, rather than or in addition to functioning as a managed hub, community machine 116 may be designed to be used predominately for personal and/or non-commercial purposes by its user, as opposed to commercial-grade servers and databases that may be used to implement managed hub functionality. As such, instead of community management circuitry 118A, managed hub processor 120A, local internet drive 122A and/or trusted peer machines 124A, community machine 116 may include community management circuitry 118B, independent publisher processor 120B, local internet drive 122B and/or trusted peer machines 124B. Community management circuitry 118B, independent publisher processor 120B, local internet drive 122B and/or trusted peer machines 124B may be embodied in hardware, firmware and/or software similar to or the same as that discussed above in connection with community management circuitry 118A, managed hub processor 120A, local internet drive 122A and/or trusted peer machines 124A, respectively.

However, unlike that discussed above, community management circuitry 118B, independent publisher processor 120B, local internet drive 122B and/or trusted peer machines 124B may be optimized to be used as, for example, a network device used to generate data to be published to the community internet drive and/or used to consume data that is published onto the community internet drive. Community management circuitry 118B may also be configured to perform data processing, application execution and other processing associated with the distributed data transfer, storage and management functionality discussed herein. In some embodiments, for example, community management circuitry 118B may be included in a user machine, such as a personal computer, tablet or smart phone, that can be configured to generate a request to be included in the community internet drive. The request can be transmitted to a remote machine, such as a server and/or other machine that is configured to function as a managed hub. The first user machine can then receive configuration data from, for example, the remote machine. In some embodiments the configuration data may come from another user machine via a direct connection, such as those sometimes used for peer-to-peer communications (as opposed to client-server communications).

In some embodiments, processor 128 may also or instead be included in community machine 116. Processor 128 may function as a general processor and/or provide some or all of the functionality associated with managed hub processor 120A and/or independent publisher processor 120B. Like managed hub processor 120A and/or independent publisher processor 120B, processor 128 may be implemented in a number of different ways. For example, processor 128 may be embodied as various processing means such as a microprocessor or other processing element, a coprocessor, a controller or various other computing or processing devices including integrated circuits such as, for example, an ASIC (application specific integrated circuit), an FPGA (field programmable gate array), or the like. In some example embodiments, processor 128 may be configured to execute instructions, such as those discussed in connection with FIGS. 6-11, stored in storage device 126 and/or other storage device that is otherwise accessible to processor 128. As such, whether configured by hardware, firmware and/or software, or by a combination thereof, processor 128 may represent an entity (e.g., physically embodied in circuitry hardware) capable of performing operations according to embodiments of the present invention while configured accordingly. Thus, for example, when processor 128 is embodied as an ASIC, FPGA or the like, processor 128 may be specifically configured hardware for conducting the operations described herein, including those discussed in connection with FIGS. 6-11. Alternatively, as another example, when processor 128 is embodied as an executor of software instructions, the instructions may specifically configure processor 128 to perform the operations described herein.

In some embodiments, storage device 126 may include one or more tangible, non-transitory memory devices such as, for example, volatile and/or non-volatile memory that may be either fixed or removable. Storage device 126 may be configured to store information, data, applications, instructions or the like for enabling each machine of system 100 to carry out various functions in accordance with exemplary embodiments of the present invention. For example, storage device 126 can be configured to buffer input data for processing by processor 128, community management circuitry 118A and/or community management circuitry 118B. Additionally or alternatively, storage device 126 could be configured to store instructions for execution by processor 128 and/or community management circuitry 118A and/or community management circuitry 118B, such as those discussed in connection with FIGS. 6-11.

Storage device 126 may also include some or all of local internet drive 122A/B and/or trusted peer machines memory 124A/B in addition to or instead of community management circuitry 118A and/or community management circuitry 118B. As such, local internet drive 122A/B and/or trusted peer machines memory 124A/B may be included in storage device 126, community management circuitry 118A, community management circuitry 118B, and/or any other component(s).

As yet another example, processor 128, community management circuitry 118A and/or community management circuitry 118B may store data in one or more remote, centrally-networked databases, as well as a variety of files, contents, and/or data sets (including lists of trusted peer machines, encryption algorithms, and/or other data useful for implementing embodiments discussed herein), among other things. The contents of storage device 126 and/or one or more databases may include instructions that are stored for execution by processor 128, community management circuitry 118A and/or community management circuitry 118B to carry out functionality associated with each respective application.

Processor 128, community management circuitry 118A and/or community management circuitry 118B may be in communication with or otherwise be configured to control user interface 130 and communications interface 132. User interface 130 may be in communication with processor 128, community management circuitry 118A and/or community management circuitry 118B to receive an indication of a user input at user interface 130 and/or to provide an audible, visual, mechanical or other output to a user. As such, user interface 130 may include, for example, a keyboard, a mouse, a joystick, a display, a touch screen, a microphone, a speaker, a cell phone, and/or one or more other input/output mechanisms. In exemplary embodiments, user interface 130 may include interface options for changing parameters and other configurations of one or more machines included in system 100.

Communications interface 132 may include one or more interface mechanisms for enabling communications with other devices and/or other types of machines. In some embodiments, communications interface 132 may comprise any means embodied in hardware, firmware, software, or combination thereof that is configured to receive and/or transmit data from/to a network and/or any other device or module in communication with processor 128, community management circuitry 118A and/or community management circuitry 118B. In this regard, communications interface 132 may include, for example, an antenna (or multiple antennas) and supporting hardware (e.g., circuitry, communication ports, etc.), firmware and/or software for enabling communications with a wireless communication network and/or a communication modem or other hardware/software for supporting communication via cable, digital subscriber line (DSL), universal serial bus (USB), Ethernet and/or other means for communication. In situations where communications interface 132 communicates with a network, such as network 102, the network may be any of various examples of wireless or wired communication networks such as, for example, data networks like a Local Area Network (LAN), a Metropolitan Area Network (MAN), and/or a Wide Area Network (WAN), such as the Internet.

Processor 128, community management circuitry 118A and/or community management circuitry 118B, and/or any other circuitry that may be incorporated into one or more machines in accordance with some embodiments discussed herein, may operate under control of a computer program product and be used to control mechanical components and/or exchange transitory signals containing data. For example, a computer program product can be implemented on a computer-readable storage medium, such as storage device 126.

As will be appreciated, any such computer program instructions may be loaded onto a computer or other programmable apparatus, e.g., processor 128, community management circuitry 118A and/or community management circuitry 118B, to produce a machine, such that the instructions which execute on the computer or other programmable apparatus create means for implementing the functions described herein. These computer program instructions may also be stored in a computer-readable memory that may cause a computer or other programmable apparatus to be configured to function in a particular manner, such that the instructions stored in the computer-readable memory produce an article of manufacture including instruction means to implement the functions described herein. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions described herein. In this regard, community machine 116 may include any type of circuitry to facilitate the functionality discussed herein.

Figure 2:
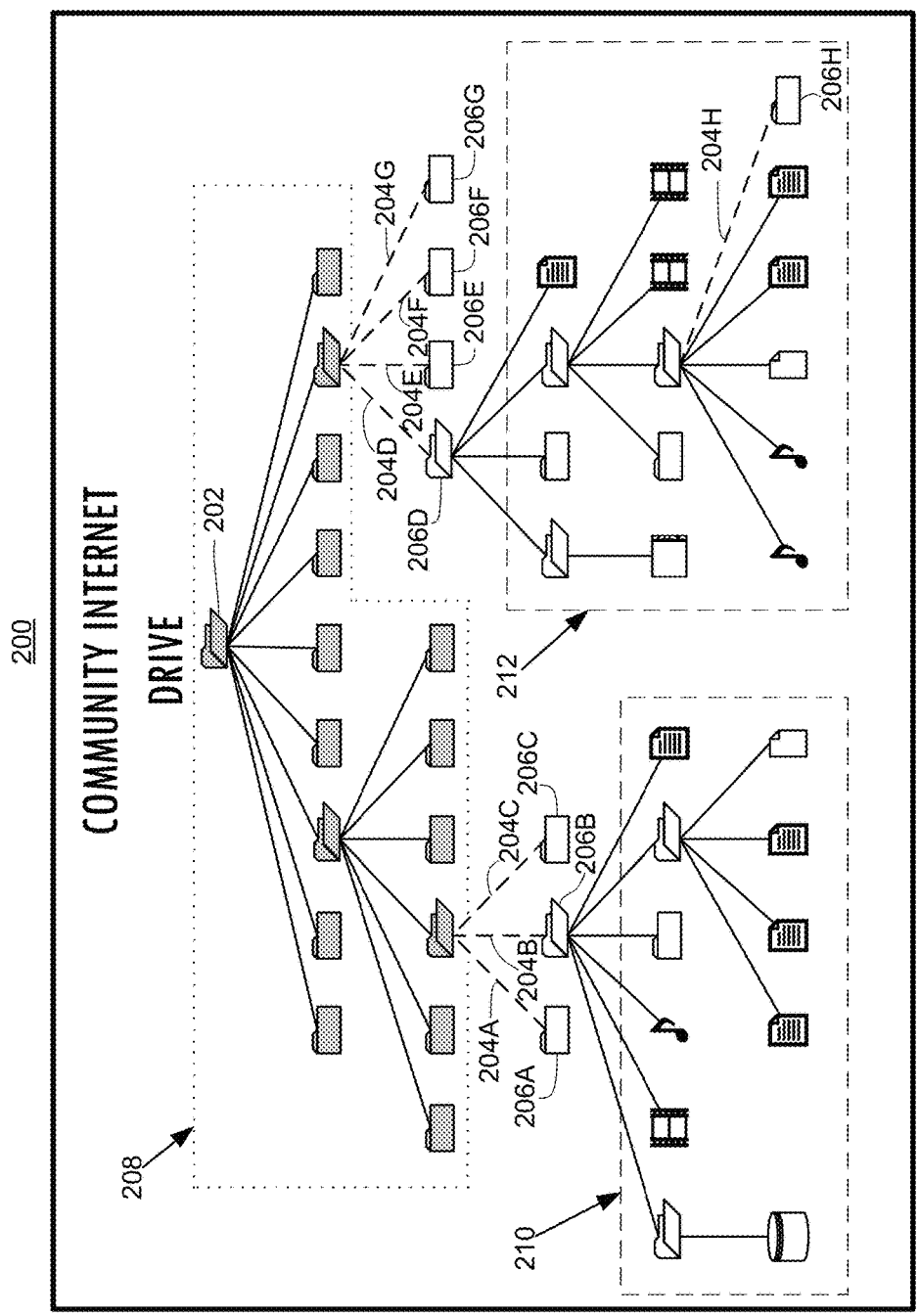
FIG. 2 shows an example of logical mounting of local subdirectories into a virtual community internet drive in accordance with some embodiments discussed herein.

FIG. 2 shows a conceptual example of a virtual file system that may be implemented by a community internet drive, such as community internet drive 200. As noted above, community internet drive 200 may be distributed among a plurality of community machines, each having one or more local storage devices configured to function as local internet drives, such as local internet drives, and/or trusted peer machines memory among other things. Community internet drive 200 can be configured to store data associated with, for example, a community namespace, and also provide a root file 202 to the virtual file system. In some embodiments, some or all of community internet drive 200 may be implemented by networked, centrally-located servers and/or databases that are implemented by a community machine under the control of a network administrator as opposed to a community member, publisher, or other type of user.

In some embodiments, community internet drive 200 may be implemented as a hierarchical namespace as shown in FIG. 2. In other additional or alternative embodiments, community internet drive 200 can include the degenerate case of a hierarchy of a single level. Community internet drive 200 can include one or more folders of various types that can be linked, mounted or otherwise associated with each other in various ways. For example, connections 204A-204H can be included in network 102 and/or the dashed lines shown in FIG. 1A.

Community internet drive 200 may also include one or more data folders, such as mount points 206A-206H. One or more data folders, such as those in box 208, may represent the centralized framework of the community internet drive 200 provided by a central server. The folders in box 208 may be provided as a service for the community, and mount points 206A-206H can include content published by the community members using community machines. The folders of box 208, although being configured to operate as a virtual file system in some embodiments, can also or instead be included in one or more community internet drives (such as community internet drive 122) maintained by community members (as opposed to network administrators) and/or be configured to contain data associated with categorization for namespacing, data for generated pages of descriptive of controlling web presentations, and/or public domain data hosted as a service by community internet drive 200, among other things.

One or more mount points, such as mount points 206A-206H, can be a subdirectory of one or more namespace folders of box 208 and be attached to pull in community member data. In some embodiments, the connections to those community members can include outside wiring in a datacenter used to implement the networked managed hub and/or the connections shown in FIG. 1A.

Figure 3:
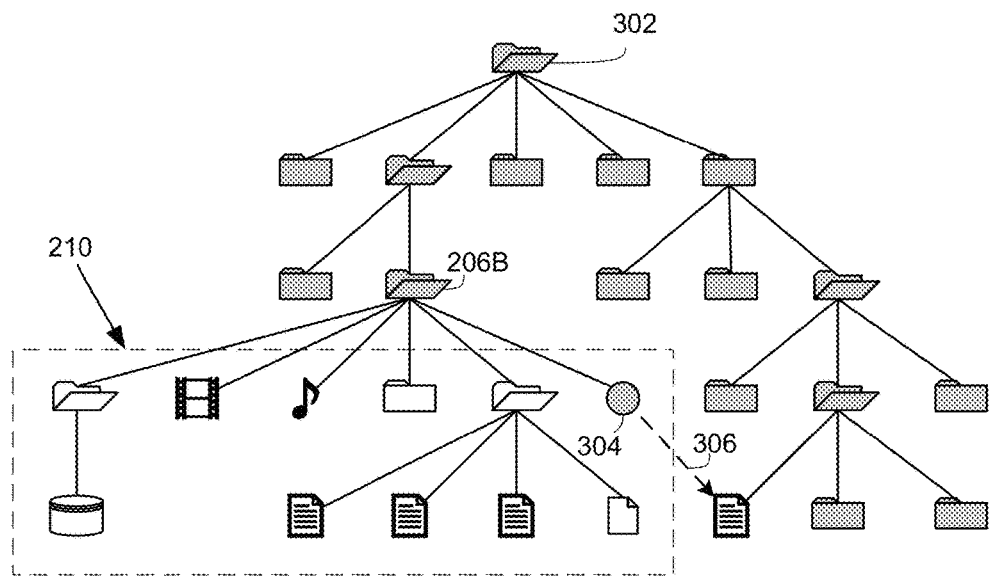
FIG. 3 shows one example of a user's drive connected to the community internet drive in accordance with some embodiments discussed herein.
Figure 4:
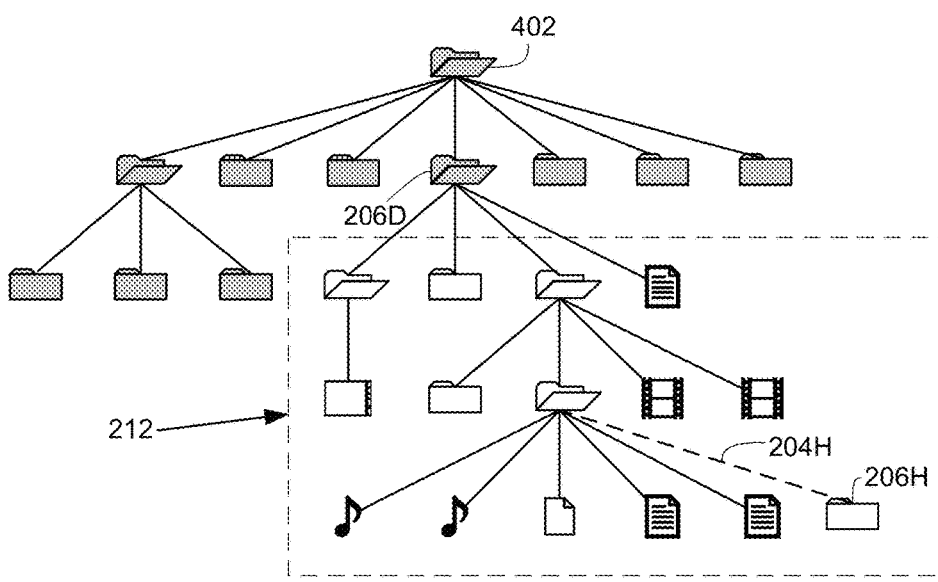
FIG. 4 shows another example of a user's data connected and published in accordance with some embodiments discussed herein.

Box 210 and box 212 shown in FIG. 2 are also shown in more detail in FIG. 3 and FIG. 4, respectively, and illustrate an example of how community members can publish from their personal file systems in accordance with some embodiments. For example, inside box 212, connection 204H and mount point 206H illustrate how links to other elements of the community internet drive 200 can be embedded within a subtree. Among other things, such symbolic links can be to other devices owned by the same community member (e.g., stored on the same user's community machine(s), such as on a user's tablet computer, cloud-based storage device and/or laptop computer). As such, private or public data from a laptop, desktop, and smart phone for the user can be aggregated under one directory tree in one virtual file system in some embodiments.

FIG. 3 shows box 210, which is an example of an independent publisher's local internet drive (included in the independent publisher's public portion of its local storage device) and as it can be integrated into the community internet drive that is then be spread out across multiple community machines, such as at least one community machine 116 discussed in connection with FIGS. 1B and 2. The drive root folder, folder 302, of the user's file system can be a locally stored folder in the community machine's local storage device (e.g., storage device 126 of computer 106) unrelated to root file 202 of community internet drive 200 (which may be stored in storage device 126 of server 104). The managed hub can be configured to enable a user to choose a folder, such as mount point 206B, to contain a subtree to publish in association with the user. In response to the user indicating a desire to use a locally stored folder as a mount point in the community internet drive, community machine 116 can be configured to make the data within the chosen folder (and/or any subfolders) shared data. As such, the data within the chosen folder can be considered "transferred" and/or added to the "shared portion" (e.g., local internet drive 122A/B) of the storage device (e.g., storage device 126) from the "private portion" of the storage device (e.g., the portion of the storage device 126 that is excluded from the community internet drive).

In the example shown by FIG. 3, the user's published data, in the shared portion of the storage device, includes a link 304 to other content on the community internet drive associated with the user. The link 304 can refer to any other file or folder, whether from the shared portion of the member's storage, or elements of the otherwise private portion of local storage that are shared individually through that reference, or even references to other data within the community internet drive from other members (where the linking member must always have access to the linked content). Link 304 can be implemented in any suitable way or combination thereof, including without limitation using operating system features for writing a file, making an entry in a file containing this and other settings, and/or adding a record to a database, among other things. In some embodiments, software executed by the member's community machine, such as community machine 116, can cause the member's community machine to be configured to connect across path 306, so that the destination point of that symbolic link appears within the published space. The published folders and data in box 210, including the resolved link, are associated with the shared portion of the community machine's local storage device and, therefore, may appear within community internet drive 200.

FIG. 4 shows box 212, which represents another example of the logical organization of another independent publisher's local internet drive (included in the independent publisher's public portion of its local storage device) and as it can be integrated into the community internet drive. Drive root folder 402 of the second member's community storage device can again be unrelated to root file 202 of community internet drive 200 (which may be stored at the managed hub device), and/or the drive root file of other community members, such as folder 302 of the first member's machine discussed in connection with FIG. 3. In the example shown in FIG. 4, the second member's machine (i.e., the user of drive root folder 402) has chosen a different directory, namely mount point 206D, for the second member's published subtree from the second member's local storage device. Within the second member's subtree, community internet drive 200 can be configured to include (e.g., in response to receiving a user indication and/or automatically), based on the second member's interests and preferences, a connection 204H to another folder, such as mount point 204H, elsewhere on community internet drive 200 (e.g., on another community machine included in the system). With another connection (not shown) to another storage device below a mount point 206H, a free form assemblage of content under namespaces based on individual preferences can be provided by community internet drive 200. Such an organization of community internet drive 200 is another advantage of some embodiments discussed herein, both to the users who act as publishers expressing themselves and to the users who act as consumers who can benefit from the organization during data discovery.

In this regard, the published contents, for example, of box 210 and box 212 can be files, folders and/or application data, among other things, included in the shared portion of a community machine's local storage device. As used herein, "files" can be any collections of binary data, but are typically collections of formatted data, such as documents, videos, movies, pictures, music, games and databases, among other things. "Folders" refer to collections of files and/or other sub-folders that are used to organize files. For example, box 210 and box 212 can include files and/or folders, among other things.

Figure 5:
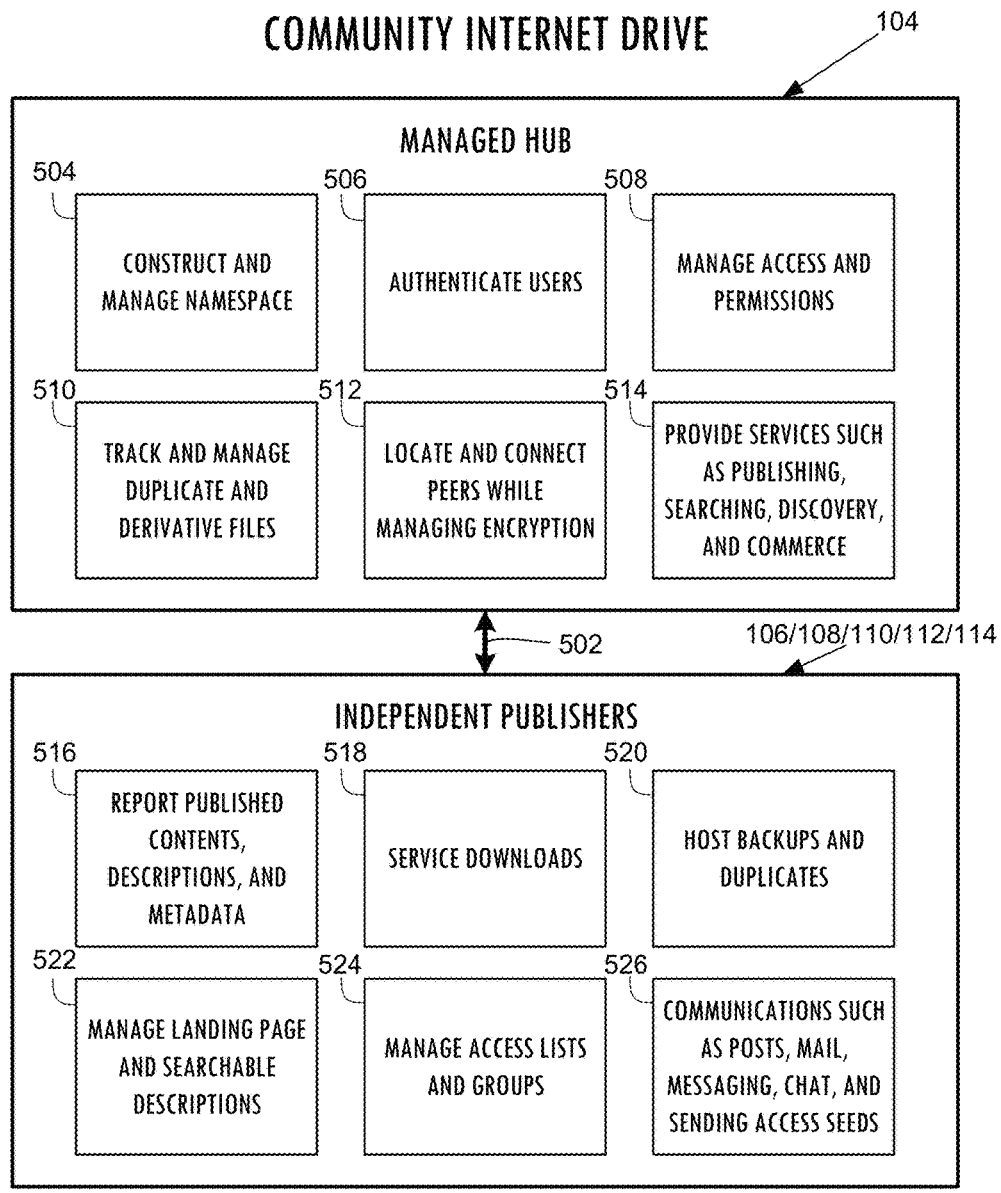
FIG. 5 shows an example block diagram of the community internet drive in accordance with some embodiments discussed herein.

FIG. 5 is a block diagram showing how the community internet drive can be enabled by the managed hub functionality of, for example, server 104 when combined with the storage devices and other circuitry of distributed heterogeneous machines, such as at least one computer 106, personal computer 108, tablet 110, laptop computer 112, and/or cellular device 114, among others. The managed hub machine can be connected to one or more independent publishers via connection 502, which may include, for example, network 102, one or more client-server connections and/or direct connections (such as those between networked peer machines). As such, the community internet drive may be provided and used to store and manage data stored among a plurality of community machines while also (or instead) providing novel data access, security and sharing features similar to those sometimes associated with social-networking systems. In some embodiments, the community internet drive may also provide web publishing and namespace hosting and assigning functionality.

For example, one or more community machine(s), such as server 104, can include managed hub data and aid in coordinating the availability of data made available on the Internet (or other network) by the independent publishers. In practice, some embodiments can include the shifting of processing to achieve differing optimizations, such as having quality and/or reliability of service for operations more at the managed hub side, and efficiencies and scalability achieved by distributing or consolidating processing loads with the independent publishers.

Embodiments consistent with or similar to that shown in FIG. 5 can combine several synergistic processes implemented by various modules included in the managed hub and/or modules incorporated into the independent publishers. "Module," as used herein, can include hardware (such as circuitry discussed in connection with FIG. 1B), firmware and/or software. Collectively, the modules shown in FIG. 5 can enable the community internet drive to provide at least some of the example functionality discussed herein.

For example, the managed hub can include module 504 as a core component, which can be configured to construct and manage namespace(s) for the managed hub. The namespace and structure overseen by module 504 specifies and identifies the contents of the virtual file system as illustrated in system 200. In some embodiments, module 504 can be hierarchical by default. In other embodiments, module 504 can include flat namespaces as a degenerate case. While a hierarchical namespace may be better in some embodiments for data organization and discovery, even a flat namespace can allow assigning a unique uniform resource identifier ("URI") to published content. As sometimes used herein, a "unique URI" refers to identifying a unique asset based on the mount point of the data instance within the community internet drive, as opposed to the opposite direction of a unique URI based on file contents regardless of location. Community machine(s) executing managed hub functions can track the instances of data, especially the common copies off each progenitor file introduced into the virtual file system. For example, consumers can request an instance of the data based on a URI, and the managed hub can match-make to all accessible copies of the data, to the limits of service level for that member and the associated access lists. Generally speaking, at least to some practical limit, the more copies uploading simultaneously from publishers, the faster the download to the consumer can be completed.

The managed hub can also include module 506, which may configure the manage hub to authenticate users. Each user of the community internet drive can be identified upon requesting and/or accessing the community internet drive (an example of which is discussed in connection with, e.g., FIG. 6). The user's identity can be determined even if that identification just marks the user as a temporary and/or anonymous user (as opposed to a registered community member and/or other type of known user). Users who are known, returning community members can be provided access to data based on and/or specific to the users' identity and any profile that may be associated with each of the community members. Module 506 can be configured to work in conjunction with other modules, such as module 508 and/or module 524 discussed below.

Module 508 can be configured to manage access and permissions for one or more community machines to provide managed hub functionality. The access and permissions managed by module 508 are the access control for the virtual file system as illustrated in system 200. For example, module 508 can enable the managed hub (e.g., server 104) to track permissions from each publishing user of the independent publishers (e.g., computer 106, personal computer 108, tablet 110, laptop computer 112, and/or cellular device 114), so that the view presented to a consumer end user is limited to match the end user's level of access. The independent publishers may use module 524 to manage access lists and groups by, for example, restricting data using rules setting various degrees of security. For example, the levels of security, which may range between publicly available data and private data and/or data that is specific one or more particular users. For example, public data can be exposed to everyone (e.g., similar to a public Internet web page), private data can be defaulted to be restricted to personal use and, in between, levels of semi-private data can be configured such that the data can be exposed only to people's machines, where the people have, for example, been granted access individually or have be placed in an in-group with access, such as friends and family. Specific relationships associated with the data can be assigned to the data in response to a user entry and/or in response to a preconfigured setting of the system. For example, a relationship can be configured to enable particular users to be granted write access to create files in specific directories on a publisher's local drive. Also, in some embodiments, module 508 and module 524 can be configured to enable relationships that provide an individual end user and/or some set of end users access to particular content.

Module 524, which may be implemented by the independent publishers to manage friend and access lists, can be configured to function in conjunction with, for example, module 526 and/or module 508. In some embodiments, after module 524 is used by a community member user to specify the user's desired relationships to be associated with the user's data, the managed hub can be configured to use manage access and permissions 508 even when that community member is offline. For example, to limit spam, one or more users may configure their respective portions of community internet drive to block or accept communications through module 526 which come from users that are not in-group members or otherwise receive notifications of changes associated with that user's data. For example, when a first user's communications (such as, mail, messaging and chat data) is authorized for other users that the first user assigned to an in-group, those communications can be welcome or unwelcome to the other users depending on whether the other users also see the first user as belonging to an in-group of theirs. When the relationship has two members mutually in in-groups, module 526 has permissions to operate most fully in communication and notifications. For example, a notification can be sent to in-group members in response to one of the users adding data to the user's shared folder on the community internet drive. In this regard, the community internet drive can be configured to provide value when the shared content and the communications are following connections that map personal relationships.

As another example, other types of data (such as posts) can be treated by embodiments discussed herein as an announcement of public content. In some instances, access seeds can be sent to leverage the location-based URIs of the system and to module 506. As sometimes referred to herein, "access seeds" are combinations of keys, which may be bundled as a file, to allow a particular user access to a particular data. A member of the general public, for example, might be granted access to data generally restricted to a user's friends, for instance when the data is determined by the community internet drive to be somehow associated with the member of the public (e.g., the data is a picture including the member of the public), and the user having an in-group association might be granted access to some data that was otherwise private. In some embodiments, a particular member of the public might be granted access to a user's private data (e.g., an accountant or attorney may be granted access to tax return data) through an access seed.

When a file is added to the community internet drive from an external source, that file may become an original or progenitor for all future chains of copies. Module 510 of the managed hub can be leveraged to, for example, track and mange duplicate and/or derivative files of that progenitor. For example, the community internet drive can be configured to have an awareness of each file download the drive mediates. Until modified, each downloaded file can be considered in the community internet drive to be a duplicate of the original. Being configured to consider downloaded files as duplicates provides a number of advantages, some of which are discussed below.

As a first example, when the original data is unavailable (because, e.g., the independent publisher hosting the data has been powered down or otherwise disconnected from the network), the duplicate copy of the downloaded file can be provided to the end user when that end user has been authenticated as having been assigned the appropriate permissions by the independent publisher of the duplicate file. The duplicate file can, in some embodiments, still continue to exist after the original has been deleted. As another example, the duplicate file can be used for internal operating efficiency. In such embodiments, multiple sources for an upload can act to speed up the download to the end user, where each uploader is participating in sharing their bandwidth to aid the downloader.

Derivative files in module 510 can arise after the duplicates are edited and/or otherwise substantively modified. Awareness of both duplicate and derivative files by the infrastructure implementing the community internet drive can aid in mitigating against link rot and provide other advantages when the original file is lost and/or destroyed. As such, some embodiments of the community internet drive, despite being dependent on machines that can be powered down and/or otherwise have no centralized control over their availability (because control rests in each machine's user), may achieve a higher reliability than might be achieved with a conventional website where each site redesign can destroy saved links.

FIG. 5 also shows module 518 as part of the independent publishers, which may be configured to host backups and duplicates. In some embodiments, module 518 may be configured to operate in conjunction with module 510 of the managed hub. When module 518 services a download, that member's community machine is donating bandwidth to the benefit of the consumer. If that content was hosted in response to module 510 requesting module 520 to host a backup or duplicate file, module 518 can be configured to enable the community member to donate, e.g., storage and/or bandwidth. Publishing users of independent publishers can agree to, for example, hosting data from other publishing users of independent publishers by using the managed hub to coordinate the distribution of data among strangers and/or other users that may not otherwise know each other. In such instances, there may be symbiotic advantage achieved through blind collaboration. For example, users may mutually agree to provide their community machines to enable data redundancy to other's data, thereby improving the reliability and bandwidth of the community internet drive as a whole. In this regard, the managed hub can be configured to provide a fair management and distribution of each community member user's data.

Two functions that may be included in some embodiments of the community internet drive are: one, uploading content and other data for publishing, and two, downloading content and other data for the end user (also sometimes referred to herein as the "consumer"). Several modules shown in FIG. 5 can be configured to directly or indirectly support those operations. For example, users of the independent publishers can choose which of their content to publish (as discussed in connection with, e.g., FIGS. 2-4). When content has associated metadata (e.g., descriptive data) and/or the user associated with the content is a registered user (e.g., "community member") that has descriptive data, module 522 can be configured to manage the landing page, searchable information, and/or other metadata associated with the content. The metadata can be published as well in some embodiments by module 522. As another example, module 516 can be configured to facilitate the managed hub functionality by notifying the managed hub and/or in-group machines (directly or through the managed hub) of (newly) available published data, propagating through a social network of in-group connections.

In some embodiments, the metadata may include descriptions of the content, time stamps, author information, thumbnails (for image and video data), other types of preview data (for, e.g., large or commercial content files), and/or any other type(s) of metadata. Previews, for example, can be created automatically based on an application association (such as generating a low resolution or streamed copy), and/or the publishing machine can generate custom previews.

The managed hub may include module 514 configured to facilitate the providing of various services such as publishing, searching, discovery, and/or commerce, among other things. For example, module 514 can be configured to allow the consumer to find data the consumer wishes to download.

As another example, module 514 can be configured to collect fees for commercial activity provided using one or more particular aspects of the managed hub functionality and/or any or all other functionality discussed herein. Charges can accrue to commercial customers for use of, for example, commercial namespace, the bandwidth provided and/or used, and the transaction(s) used for sales. Modules 512 and 514 operate under the guidance and constraints of module 508. As module 514 supports publishing, searching, and discovery, it will only expose and share content with members and community machines that are known to have access by 508. In the case of data restricted to an in-group, only those members with a personal relationship will have that content revealed. As module 512 seeks to match make peers for a P2P exchange, it must locate peers that both are known by 510 to be hosting a copy, with peers that also have access as is known by 508. In the case of data restricted to an in-group, the peer community machines are making connections that follow the social relationships of the members that own those machines, increasing trust and security. Preferentially friends and family share with and download from friends and family, keeping within the in-group. In some embodiments, to enable authenticated users to share data, the content and/or other data can always be encrypted using the same technique and/or keys. In other embodiments, varying encryption and/or different encryption may be used. Module 518 may also be included in some embodiments and be configured to facilitate service downloads among the independent publishers and/or to other types of the consumers.

FIGS. 5A-5E show some example alternative embodiments combinations of modules that may be included in the managed hub and independent publishers to provide different types of community internet drives.

Figure 5A:
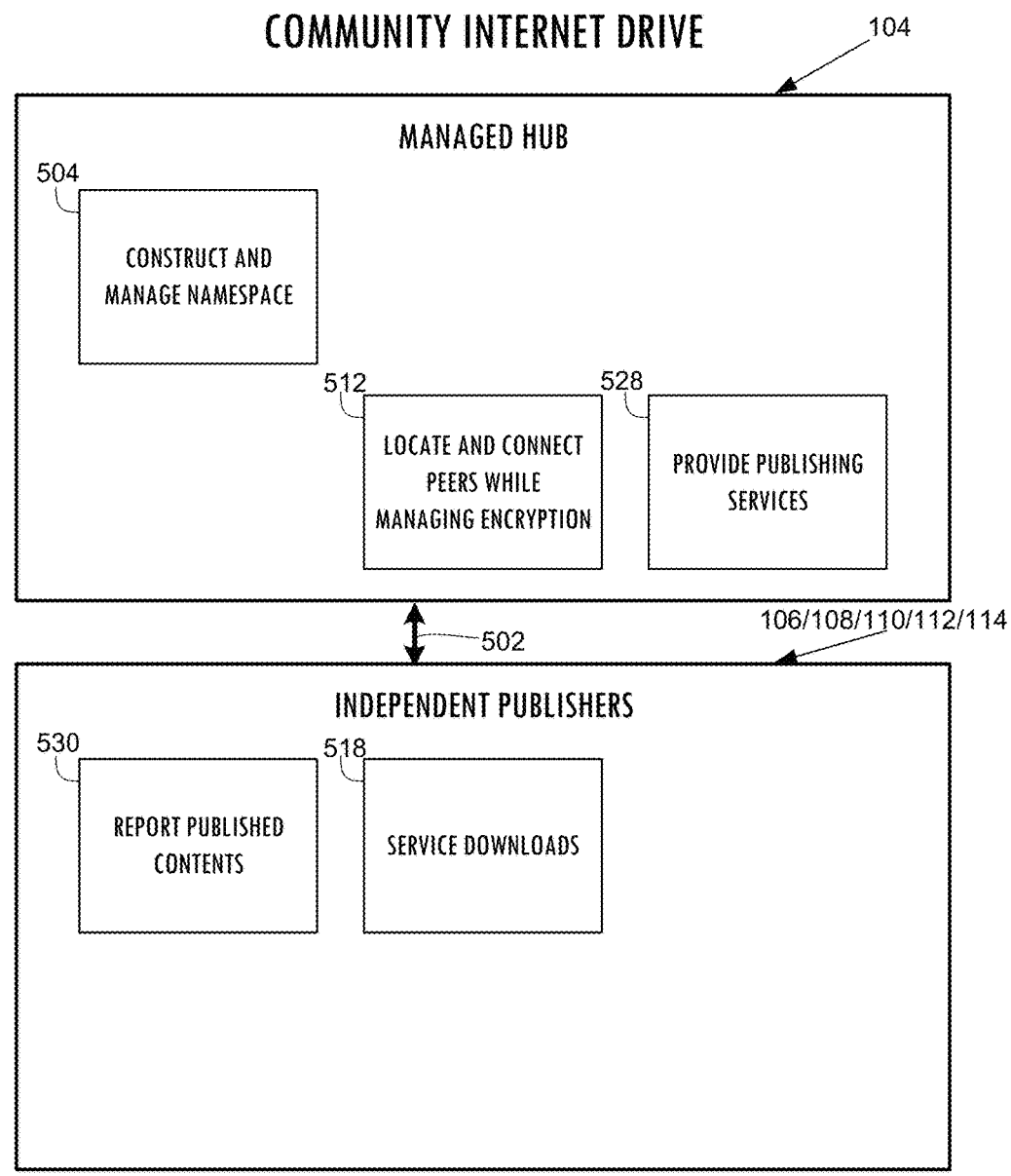
FIG. 5A-5E show additional example block diagrams of the community internet drive in accordance with some other embodiments discussed herein.

FIG. 5A shows an example where the community internet drive is implemented using fewer modules. The managed hub and the independent publishers can still be configured to provide the community internet drive as a heterogeneous set of community machines assembled to present a unified virtual file system. To that end, the managed hub may still contain module 504.

The independent publishers can likewise support fewer and/or different features in embodiments consistent with FIG. 5A. For example, module 528 can be configured to report published contents, and be similar to but less powerful than module 514. For example, module 528 may omit descriptions that may be included in module 514. As such, the consumer may be limited when browsing for content. However, even with module 528 being used instead of module 514, once the consumer has found the desired content, the managed hub can still be configured to locate and connect peers while managing encryption using module 512 and the independent publishers can still be configured to service downloads using module 518. While replacing module 514 with module 528 may reduce efficiency, ease of use, and synergistic benefits, such embodiments may still retain the reduction in barriers to publishing content as compared to known systems and methods. For example, users that are community members may not have to select and purchase a domain name, contract for content hosting, and/or install code to maintain their own web server, FTP server, or tomcat to publish so that a broader population can contribute data and files, among other things. Advantages of embodiments consistent with FIG. 5A (as compared to those consistent with FIG. 5) are simplicity in the implementation and lighter weight executables.

Figure 5B:
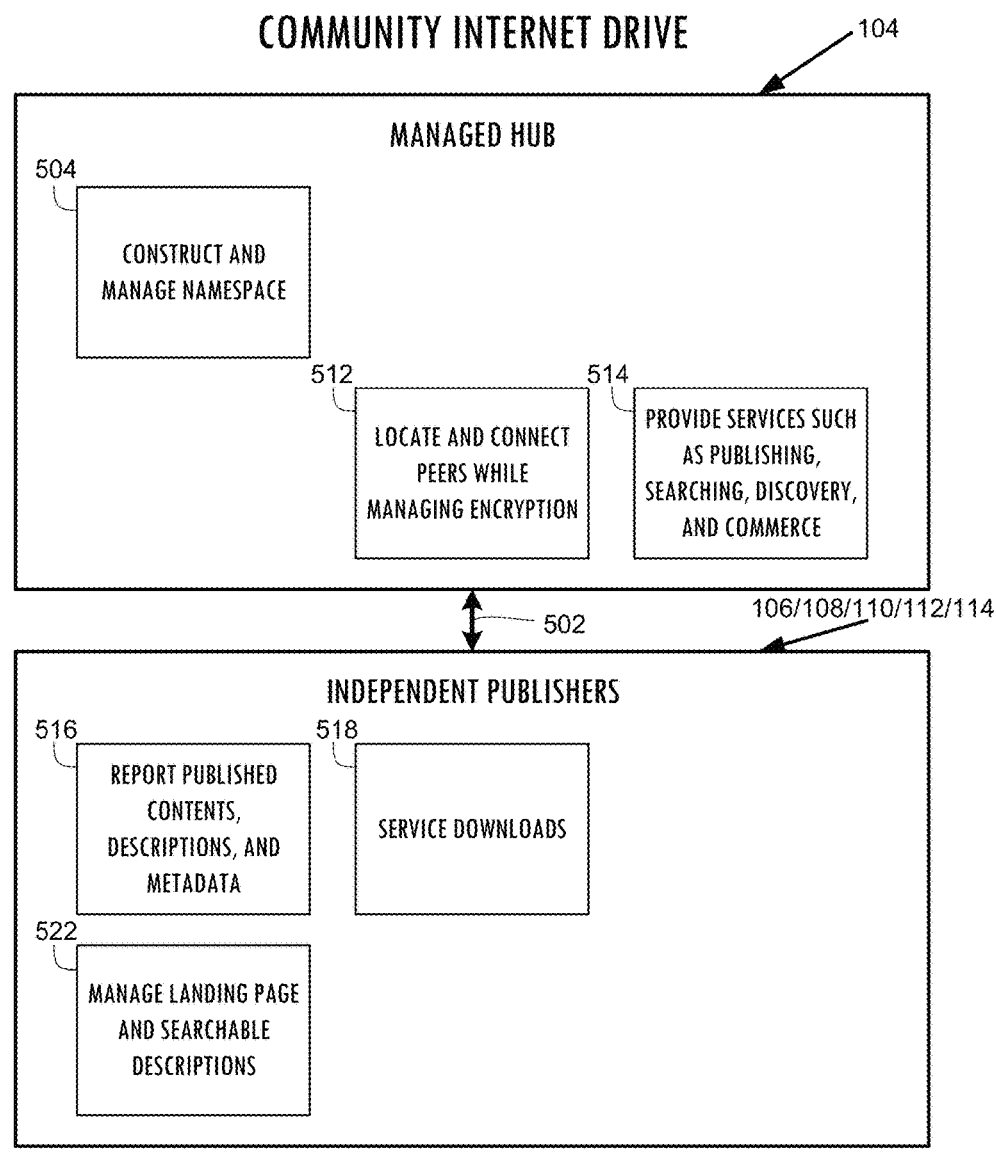

FIG. 5B shows an example system that includes the components and can be configured to provide the functionality discussed in connection with FIG. 5A, while also being configured to restore metadata and user-contributed content, such as file descriptions and rankings. Similar to the embodiments discussed above, the independent publishers can be configured to report published contents, descriptions and metadata, among other things, using module 516, service downloads using module 518 and manage landing page and searchable descriptions using module 522. The managed hub, as shown in FIG. 5B, can be configured to construct and manage namespace using module 504, locate and connect peers while managing encryption using module 512, and provide services (such as publishing, searching, discovering and commerce, among other things) using module 514. The synergistic advantages of searches across a broad and unified namespace can be restored using embodiments consistent with those shown in FIG. 5B. Similarly, a virtual file system, such as those discussed in connection with FIGS.

1A-4, can function similar to that discussed above from a user's perspective less some of the relatively more enhanced functionality discussed above.

Figure 5C:
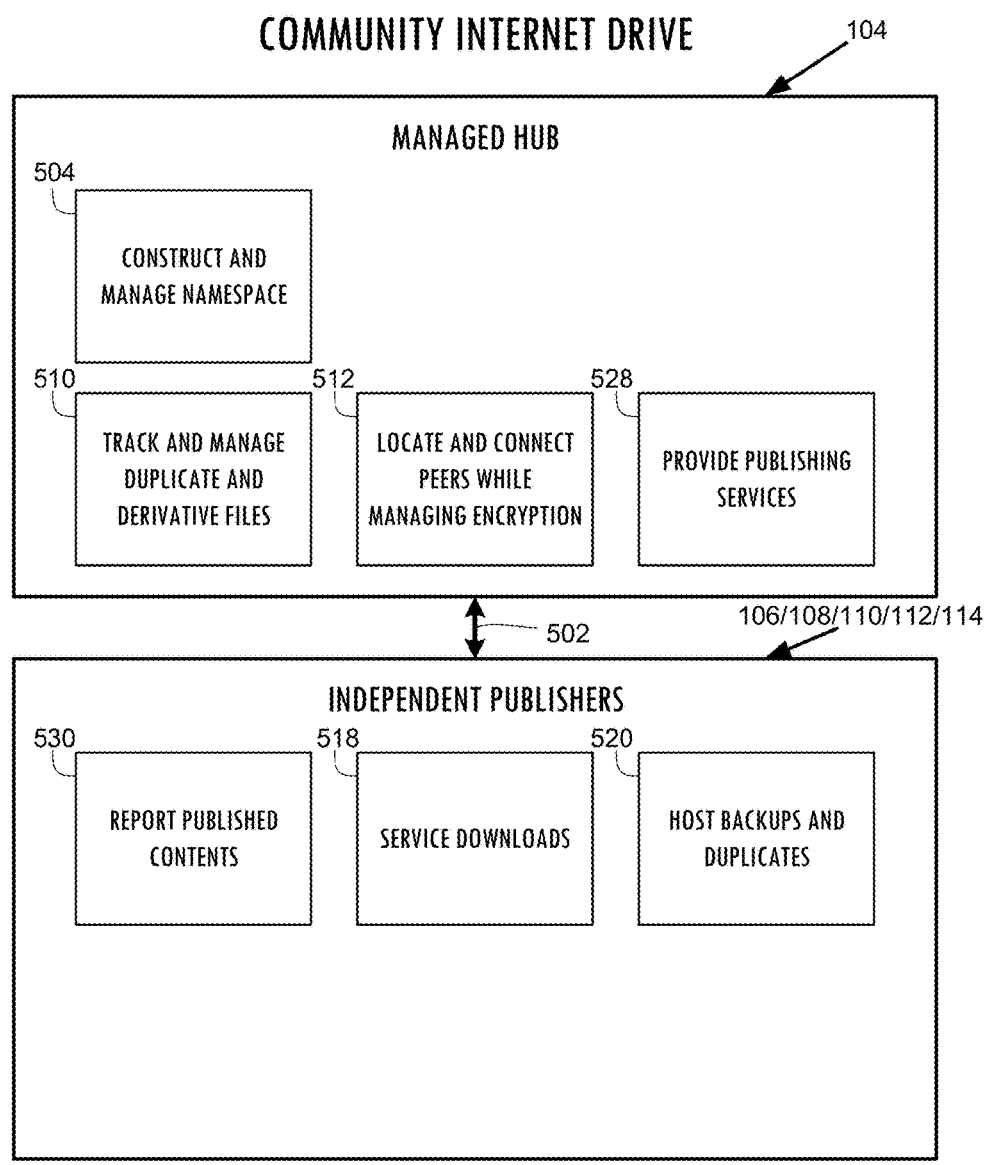

FIG. 5C shows another example in accordance with some embodiments discussed herein that can be configured to implement a virtual file system. Similar to some of the embodiments discussed above, the independent publishers can be configured to report published contents using module 530, service downloads using module 518, and host backups and duplicates using module 520. Similarly, system 100 may be configured to provide various managed hub functionality, such as construct and manage namespace using module 504, track and manage duplicates and derivative files using module 510, locate and connect peers while managing encryption using module 512, and provide publishing services using module 528. Embodiments the same as or similar to that shown in FIG. 5C can provide synergistic benefits of better availability when publishing users are unavailable, higher performance when more sources for upload are available, and recovery from link rot are all restored. Otherwise, the functionality of the community internet drive discussed above in connection with FIGS. 1A-4 has the same connectivity and user abstraction.

Figure 5D:
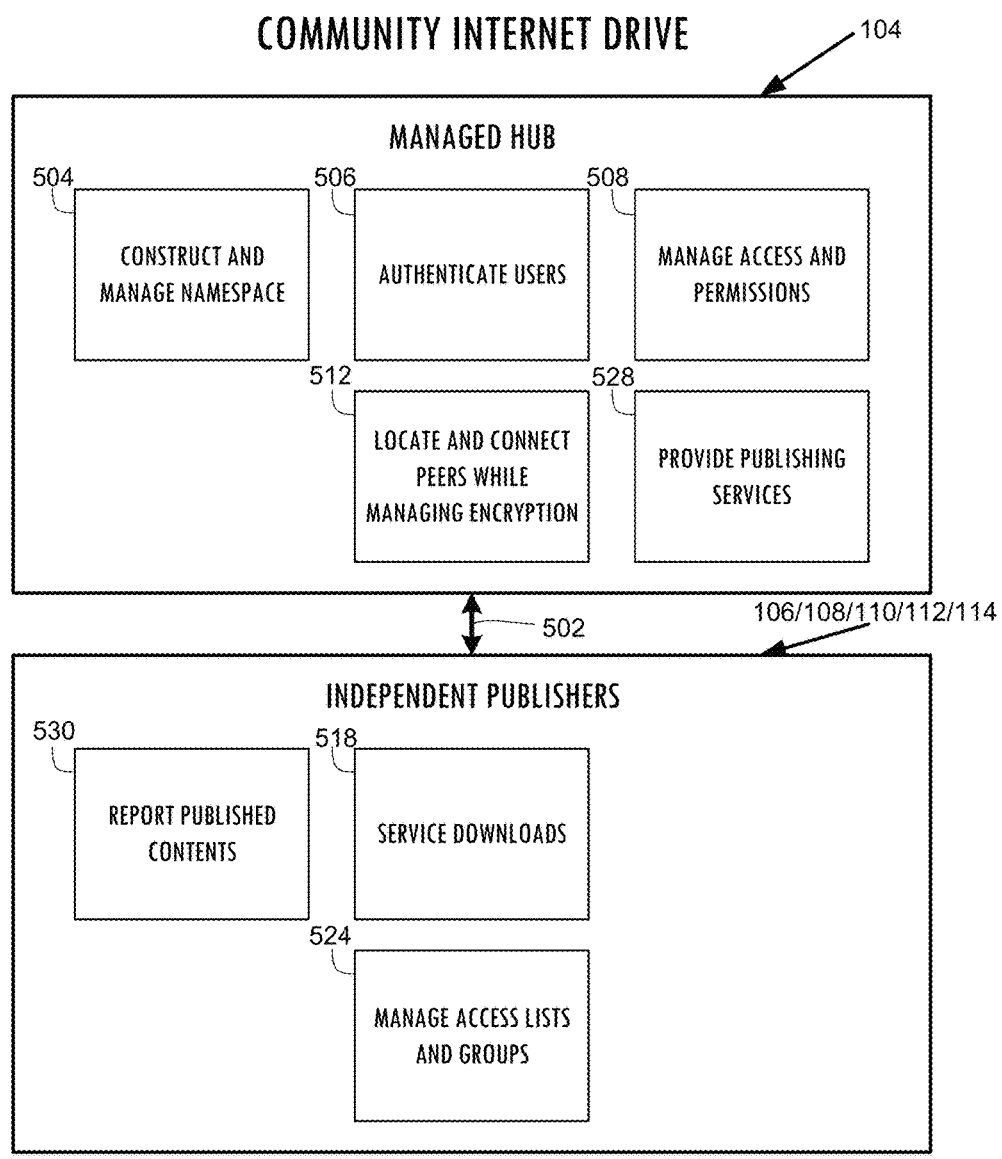

FIG. 5D shows another example in accordance with some embodiments discussed herein that can be configured to restore user authentication and access control in addition to the functionality discussed in connection with FIG. 5A. Because the managed hub can be configured to construct and manage namespace using module 504, authenticate users using module 506, manage access and permissions (based on, e.g., access control from the publishers and user identity) using module 508, locate and connect peers while managing encryption using module 512 and provide publishing services using module 528, many more synergistic benefits accrue. Coupled thereto, the independent publishers can enable the community internet drive to publish more than just public data. For example, the independent publishers of embodiments consistent with FIG. 5D can be configured to manage access lists and groups (to, e.g., limit access to particular content) using module 524, report published contents using module 530 and service downloads using module 518.

As such, embodiments consistent with FIG. 5D can be configured to vet connections before forwarding. A consumer may have acquired a link to content, but the community internet drive can be configured to determine whether that user has permission to access the linked-to content. If not, no P2P connection will be made to the independent publisher hosting the data to which the link directs, and the hosting independent publisher's IP address can remain private. In this regard, "vetting connections" can include checking whether a consumer has any legitimate purpose in contacting a publisher of data. Such vetting may aid in protecting against an unauthorized consumer stumbling on a link/URI to a file, and using it to download data that was not intended for that consumer's consumption. For example, if a consumer is not allowed access to that content based on in-group or access lists, the managed hub can simply deny the request, and the consumer will never be provided the IP address of the publisher. No P2P connection will ever be made. Privacy and security are protected.

Additionally or alternatively, a consumer's view when browsing can be constrained to their permissions, and the consumer may not be able to get, for example, the IP address and open ports of publishing users when the publishing users have no content they have exposed to the general public. Basically the community internet drive provides a firewall function, where embodiments discussed herein may also be configured to prohibit unauthorized consumers and/or other unauthorized users from being provided data that enables the unauthorized users from being able to determine, for example, what content to ask for and/or the IP address for sending user datagram protocol ("UDP") messages, among other things.

In some embodiments, the independent publishers can be configured to open transfer connection protocol ("TCP") connections to the managed hub, where for reasons of security communication is initiated from the publisher side. For efficiency, and to simplify interactions with routers and firewalls, the file transfers themselves can be established with UDP tunneling, but the UDP tunnel will only be established when there is proper access and legitimate purpose. One of the synergistic advantages that may be realized with embodiments consistent with that shown in FIG. 5D is that shared authentication among community member users can protect privacy with access control while channeling interesting content and updates, among other things, to machines indicated to be used by in-group members of the community member. As such, embodiments discussed herein can be configured to enable the right people to get priority updates and the wrong people to be blocked from connecting.

Figure 5E:
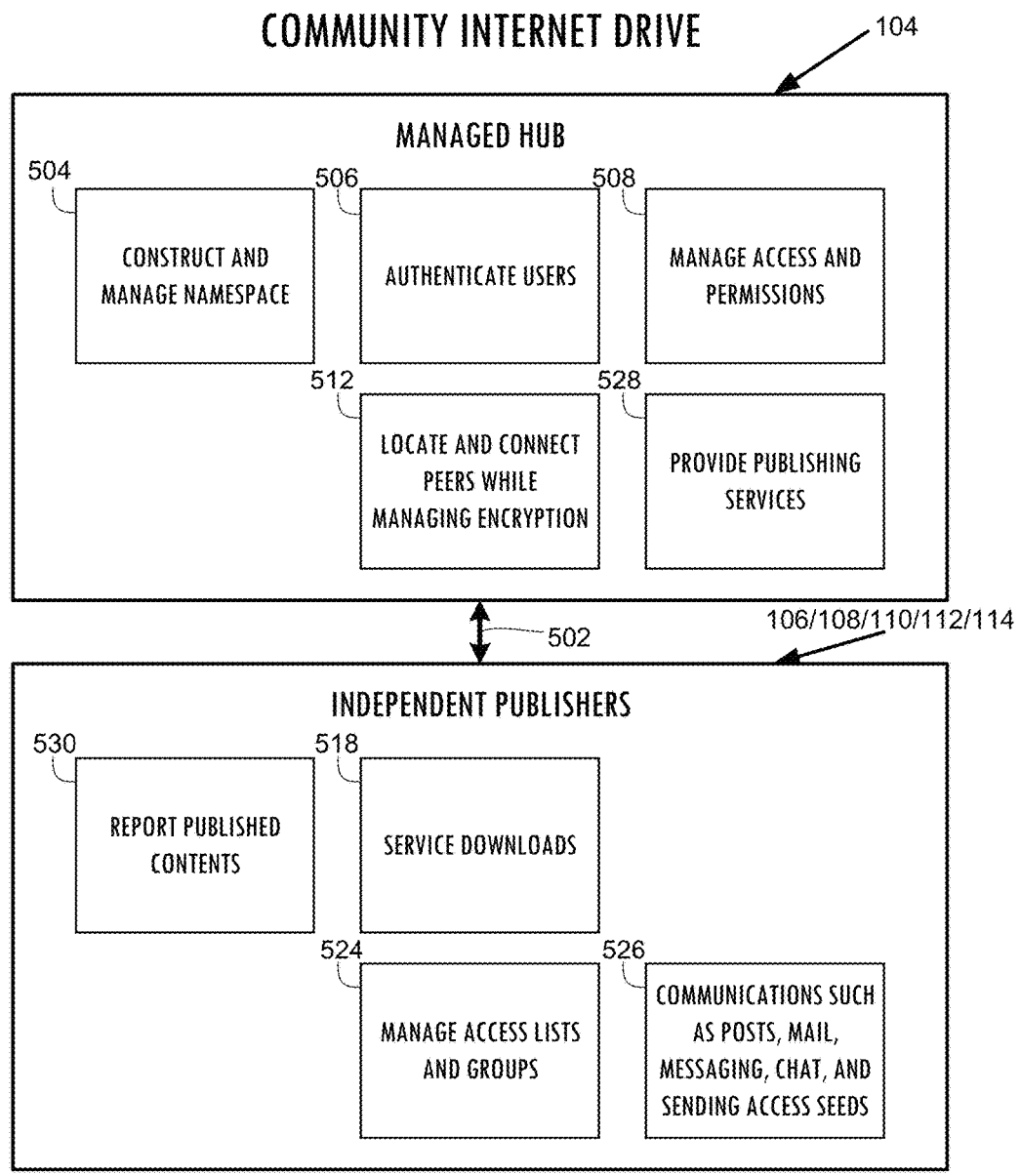

FIG. 5E shows embodiments that adds hosting of more direct user communications, both point-to-point and broadcast, to embodiments consistent with FIG. 5D. Point-to-point communications can leverage the user authentication functionality discussed in connection with FIG. 5D. Embodiments of the community internet drive offering communications such as posts, mail, messaging, chat, and sending access seeds using module 526, provide advantages of community building while adding immediacy to contacts among members while potentially long downloads are progressing. Access seeds can bundle keys based on the instance and location tracking within the community internet drive with a key based on member identity to grant targeted individual access.

FIGS. 5-5E show various embodiments, additional embodiments that are not shown may also be realized without departing from the spirit of the invention. For example, some embodiments may be a combination of FIGS. 5B and 5C, combining the features of duplicate tracking, metadata, and user contributed descriptions. One of the advantages of such a combination is that the managed hub can be configured to merge and rank descriptions on the content to improve and build more searchability. As another example, some embodiments may be a combination of FIGS. 5B and 5D, and provide advantages realized when user authentication and user contributed descriptions come together. More specifically, the combination of FIGS. 5B and 5D can be used to identify a user that added content, while also allowing the system to track rankings for each community member's descriptions and posts, thereby allowing the community internet drive to present higher quality descriptions and suppress lower quality descriptions. As yet another example, FIGS. 5B and 5E may be combined in accordance with some embodiments, which may include adding user communications, as could the embodiments of FIG. 5C and FIG. 5D, which may bring user authentication together with duplicate tracking. One of the advantages of combining FIGS. 5C and 5D is that publishing users can choose individuals or in-group members they wish to collaborate with, when they want to preferentially host backups and duplicates for people they know. The combination of FIGS. 5C and 5E can adds personal communications to the combination of FIGS. 5C and 5D. As final example, the combination of FIGS. 5B, 5C, and 5D can embody everything discussed herein except hosting user communications. Other features not explicitly discussed in FIGS. 5-5E may also be included in accordance with some embodiments to further encourage and facilitate community involvement and participation.

Figure 6:
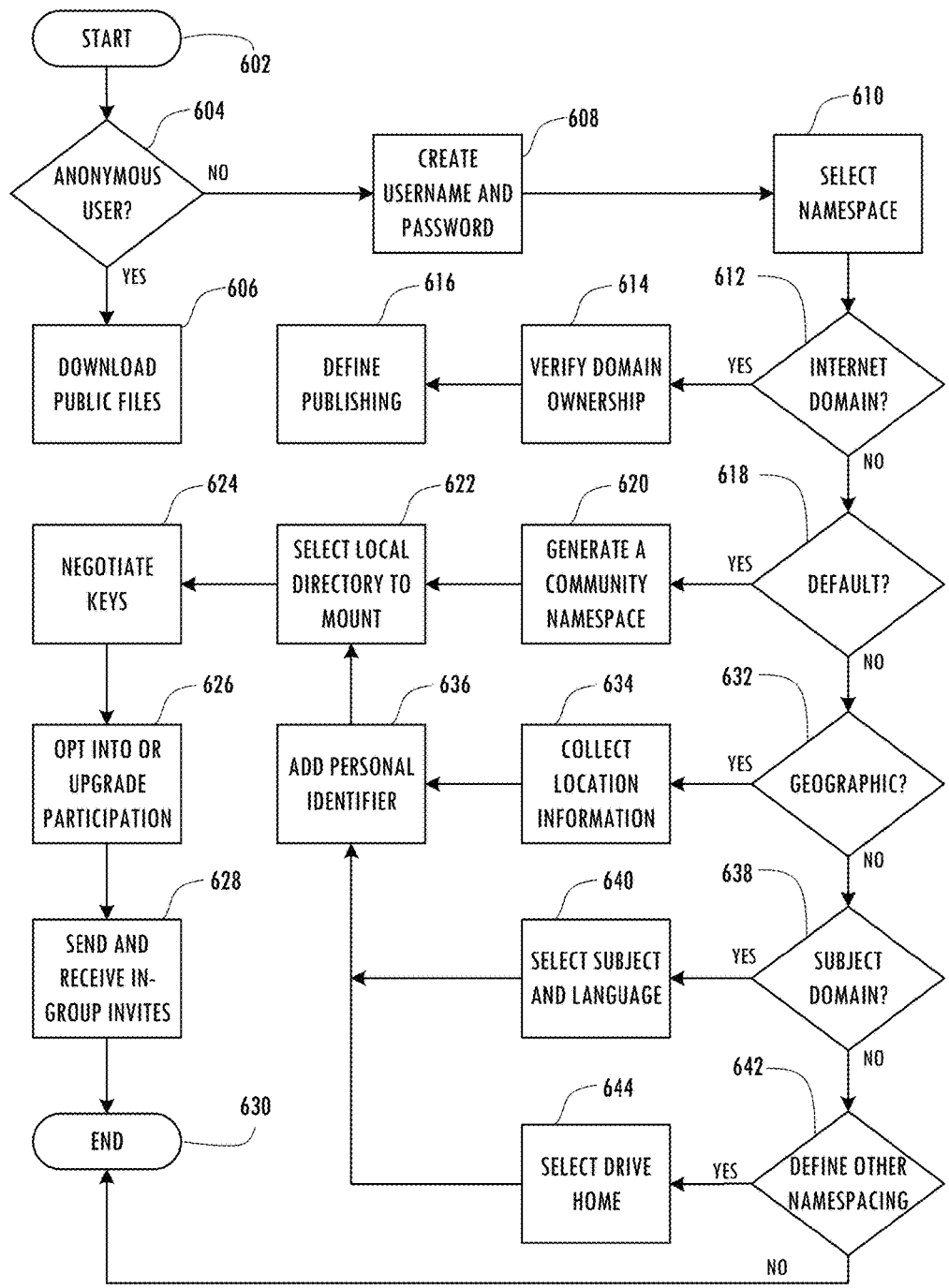
FIG. 6 shows a flowchart of an example account registration process in accordance with some embodiments discussed herein.

FIG. 6 shows a process which may be implemented to register a user using the machines discussed herein. Although the process is shown as being a sequential process, the user interfaces provided by machines discussed herein can combine many of these steps and allow users to navigate them in their own order. The process starts at 602.

At 604, a determination can be made as to whether the user wishes to become a community member or be an anonymous user. As referred to herein, an anonymous user includes a user who cannot be identified by the system, a user who wishes to not be identified by the system, and/or any other user that the system determines wants to or should bypass regular user registration. This determination may be made based on one or more pieces of data received by the system. For example, the system may receive a signal that indicates the user has selected an option to remain anonymous or to create a profile. The system may cause anonymous users to bypass regular registration.

As such, in response to determining at 604 that the user is an anonymous user, the system may be configured to provide, at 606, the anonymous user open access to only public data on the community internet drive. In some embodiments, anonymous users may not have to create a regular account with the community internet drive, and can start downloading public files immediately at 604. Anonymous users can, by definition used herein, never be on an access list or be a member of any member's in-group. Anonymous users may be prohibited from publishing data to the community internet drive. In other embodiments, anonymous users may still be required to provide at least some information that may or may not also be used to create an account with the community internet drive and/or various anonymous users may be treated differently (based on, e.g., the user's IP address, location, citizenship, other affiliations, and/or any other information associated with the user that the system is able to determine).

In response to determining at 604 that the user wishes to become a regular, registered new user, the process may proceed to 608 and the system may be configured to create a user name and password at 608 to be used for future authentication. For example, at 608, prompts may be generated and provided to a user, the data received from the user may be checked for conflicts (e.g., meeting predetermined rules associated with setting a username and/or password), and the user name and/or password may be saved. In some embodiments, the user name and password may instead or additionally be initially assigned to each user.

Each user can also be associated with one or more mount points on the community internet drive, where the associated mount point(s) becomes embedded in the URI of all the user's published data. That mount point can be part of a namespacing process that is begun at 610. Each user can be, in some embodiments, assigned a unique user name ("ID") and a unique mount point in the logical hierarchy of the community internet drive. Uniqueness here is in the sense that each mount point is associated with a single user account, although it is possible for a single user to control more than one mount point. A centralized process for generating a namespace can help affix an often hierarchical meaning in that namespace while preventing collisions. The less flat the namespace (e.g., the less the names are in one group or at one hierarchical depth), the more useful the organization becomes for some embodiments. Hierarchical organization can be better for browsing and searching some embodiments.

As referred to herein, "collisions" happen when the namespace is not unique, such as when two members want to create a mountpoint with the same name. For example, Jon Doe and Jane Doe both want jdoe@their_domain.com to be his/her domain namespace. Even in embodiments that allow P2P protocols to be used to transfer data among the machines in the virtual file system, the managed hub can be configured to assign the namespace to only one of Jon Doe or Jane Doe, such as the first member who is requested the namespace.

As noted above, at 610 the system implementing the community internet drive may be configured to allow users to begin to select their namespace. A determination can be made at 612 whether the user's account is associated with an internet domain that is already registered. If so, the system can be configured to allow the user to opt to associate the mount point for the user's allotted portion of the community internet drive to that domain name.

In response to determining at 612 that the user's account with the community internet drive is to be associated with the user's internet domain, the process can include configuring the system to further verify at 614 that the user has authorization to represent that domain.

Users with existing internet domains may also be business publishers and/or other types of users and, in some embodiments, can be offered more options at 616 to define their data publishing, beyond those options of value to typical member users of the community internet drive. For example, the community internet drive might redirect traffic to the community member's existing URL, or the business user might integrate an application programming interface (API) to allow more seamless operation of file sharing between the community internet drive and community member's non-community infrastructure (e.g., private portions of machines and/or entire machines that may be accessible to community members, but not be part of the community internet drive).

In response to determining at 612 that that the user's account with the community internet drive is to be associated with something other than a previously-registered internet domain, the process may proceed to 618. At 618, the system can be configured to determine whether the user has indicated a desire to create an impersonal account, which may be the default choice at 618.

If so, community internet drive 618 can be configured to generate a community namespace for the mount point at 620, and the system can proceed to let the user publish.

At 622, the system can enable the user to choose a directory including content to be published, thereby causing the partitioning of the user's local storage device into a shared portion and a private portion. Selecting the local directory to mount at 622 can enable the system to manage publications and downloads of the user's content. Downloads happen as this member requests copies of shared files, and they are placed by the community internet drive into this directory, or into a sub-folder beneath it. Publishing is automatic for any files within or below that directory on this member's local storage device, and uploads can happen as other consumers requests those files, although the consumer may only know the mountpoint on the community internet drive, and nothing about where that shared portion of that local storage device might be embedded within the private portion of the local storage device. This distinction is implicitly and explicitly handled through namespace assignment, URI construction, and URI parsing. Namespace management is concerned with mapping an entry point for that user onto the community internet drive, typically as the leading portion of the URI. Typically the first element identifies the domain of the community internet drive, such as w3disk.com. In some embodiments, some number of folders and pages in the communal portion of the community internet drive website are traversed, as is shown in 200. Finally the mountpoint itself is reached, which is reserved for and identified with the one individual user. Later elements of the URI are actually the path within the shared portion of the member's storage that is traversed in reaching the file or folder being uniquely identified. Thus the URI in some embodiments can traverse three or more systems, from domain through website to local storage in identifying and reaching content, often in the member's home or office, or even on a mobile device in their pocket. An effectively unlimited number of systems can be traversed physically as the URI embeds symbolic links 304, or chains of symbolic links.

At 624, one or more keys can be generated that can be associated with the community member's account and used for future request validation(s) by the community member. Keys can be based on client and server identities, mount points, paths, user entered keys, and pass phrases, among other things. Among other things, the community internet drive uses those keys to validate incoming UDP traffic and stamp outgoing UDP traffic during P2P exchanges to protect against spoofing of identities.

The community internet drive can be configured to function predominately by cooperation, where the community internet drive can enable users to opt into their degree of participation at 626. For example, the more a community member invests at 626 into the community internet drive, the more resources of the community internet drive may be allocated to the community member. As a more detailed example, the amount of storage on other users' community machines made available for copies of a user's data may be correlated to the amount of local storage device 126 that the user is willing to share as local internet drive 122B (for hosting backups and duplicates, among other things on the community internet drive).

A number of other benefits may also be provided by the community internet drive as an incentive (or for any other reason) to increase a user's level of participation. For example, the more space on the community internet drive that the user has access to, the more copies of the user's data may be maintained by the community internet drive. Having more copies of the user's data may enable the user's in-group and/or other people to have better access to the user's data due to improved data availability and faster delivery, even when the user decides to power down or otherwise remove the user's machine from the community internet drive.

In some embodiments, some and/or all community members (e.g., those that attain a certain level of participation, receive a promotional level of access and/or pay a fee) may also get credit for bandwidth shared (in addition to or instead of storage space shared). Bandwidth shared may depend on the community member's uptime, their upload bandwidth, and the amount of drive space they share, among other things. Other benefits community members could receive for participation are additional system download experience, and offsets for fees for maintaining custom/premium namespacing, among other things.

"Upgrading" at 626, as referred to herein, is what happens when a community member pays for upgraded service from the community internet drive. Improved service levels from the community internet drive can be bundled with other incentives, for example usage of a custom/premium namespace or suppression of advertising. In addition to or instead of granting such benefits based on the user's commitment of resources under the user's control to the community internet drive, some embodiments discussed herein may be configured to provide some or all of the advantages discussed herein (as well as others not discussed explicitly herein) based on other criteria, such as in recognition of the user's role in aiding in the maintaining of the managed hub, the user receiving a promotional level of access, and/or the user paying a fee to receive some or all of the benefits discussed herein, among other things.

At 628, once the new user's account is fully defined, the system may be configured to generate and transmit invitations to friends to join the community internet drive. Invitations can be generated in a number of manners, most simply by generating an email invitation, but also through searching for existing members to add directly to their in-group and also keys can be generated and shared when the person being invited prefers coming to a website directly over receiving an email. The invitations can be received and accepted by the system, so that those known friends and family can be added to an in-group and get access to the new user's restricted material. The process may then end at 630.

Returning to 618, in response to the system determining the user has indicated a desire to create a more personal account/namespace (instead of the default account/namespace), the process can proceed to 632. For example, a user can choose "no" at 618 in response to the system asking if the user would like to set up a default, impersonal account, and the process can then determine, at 632, whether the user would like to construct a namespace that includes geographic information related to the user.

In response to determining at 632 that the user would like to include geographic information, such as country, state, city or zip code, the geographic information can be received by the system at 634. The data associated with the geographic information can be used, among other things, to build the namespace to help more clearly identify that user at 636. The managed hub can be configured to ensure that the combined namespace generated at 636 is not already owned by another user and is unique. Once the mount point is defined, the user can move on to publishing as discussed above.

An example namespace including geographic information, such as Encinitas, Calif., and a user name, such as Nathan, may be: "www.w3disk.com/us/ca/encinitas/nathan", as compared to a namespace that includes only user name (Sarah) information: "www.w3disk.com/sarah". The leading "us" may be geographical information (referring to the United States) determined based on the servers and other networking components used to route the user's requests, as opposed to being provided by the user at 634. Different namespaces have differing advantages and value, whether the member prefers the prestige of a shorter namespace, or not sharing their location, while to other members more explicit namespaces including location have more meaning. In other embodiments, only user-provided geographical information or data in general may be included in the namespace. The process may then proceed to 622.

In response to determining at 632 that the user would rather not include geographic information to build the namespace, the process may proceed to 638 and system can be configured to receive subject-matter data to define the domain namespace. As such, systems in accordance with some embodiments can be configured to enable community members with particular interests to congregate around namespaces as they publish and share. For example, a namespace that includes, among other things, "English" "music" for "teenagers" can have the namespace: en.w3disk.com/music/teen/aubrey. In some embodiments, such as for business purposes, variable fees might be associated with some or all of the available interest domains (and/or geographic data, among other things).

In response to determining at 638 that the user has selected to define a domain namespace using subject matter information, the process can proceed to 640 to enable the user to select the language of the user's content and/or select from the supported subject domains at 640. The process may then proceed to 636 discussed above.

Another option that may be included in process is a determination at 642 as to whether the user would like to define any other choices for building the user's namespace in the community internet drive. For example, in response to determining at 642 that the user would like to define other aspects of the namespace, the process may proceed to 644 and the user may find an open location in the community internet drive's virtual file system, selecting where to insert the user's mountpoint.

In some embodiments, one or more namespaces may be tagged by the system as being premium namespaces for mount points and can be offered for a fee (e.g., a flat fee, subscription, etc.). In such embodiments, one or more additional steps may be included in the process that enables the verification of payment. Other steps may be included in the process and/or any other process discussed herein. Additionally or alternatively, one or more steps may be rearranged and/or combined. For example, while 634, 640 and 644 are shown as being alternative functions in the process, the functions associated with 634, 640 and 644 may be performed in series even when one or more of the decisions at 634, 640 and/or 644 are affirmative.

Figure 7:
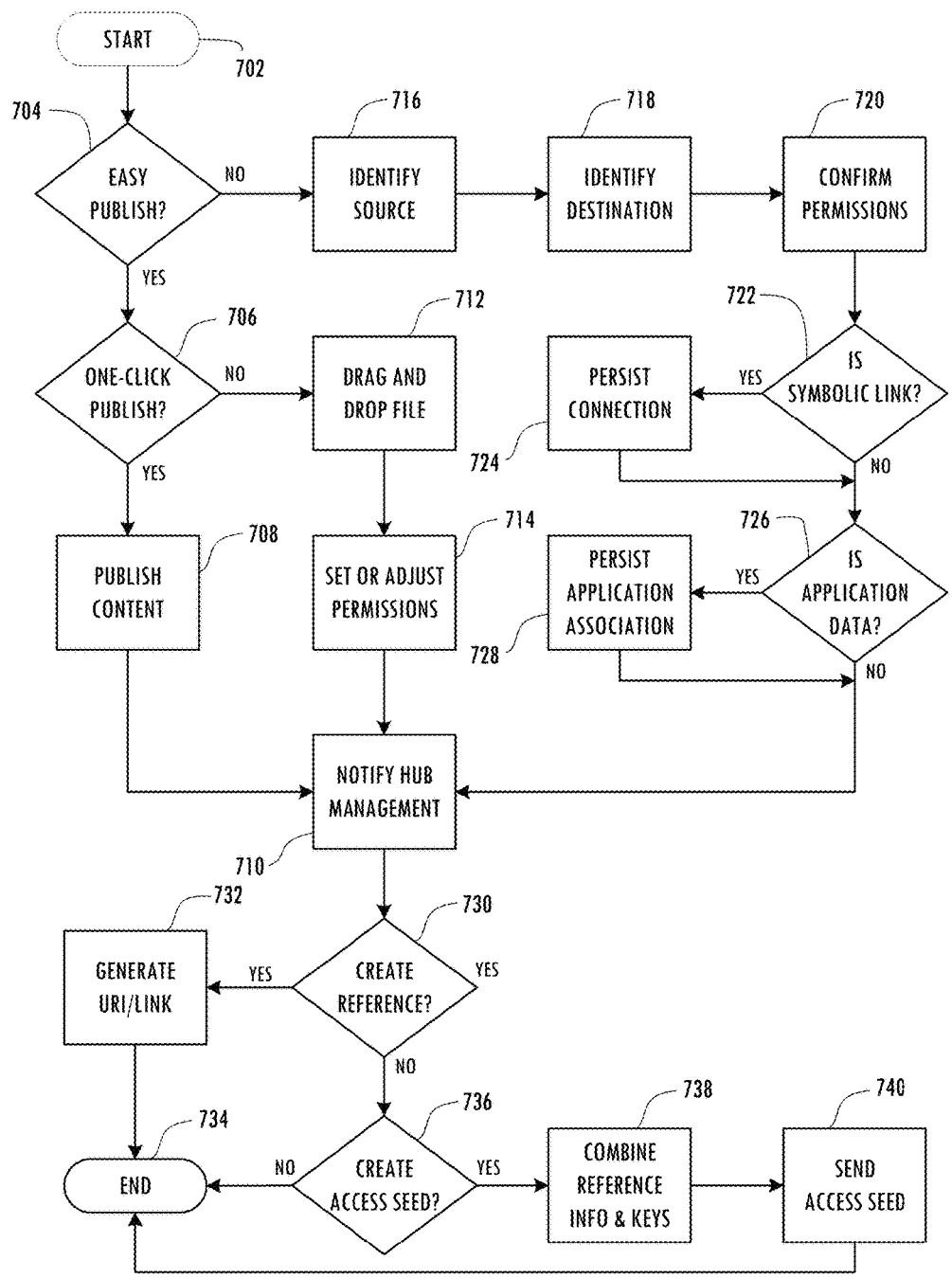
FIG. 7 shows a flowchart of an example client side operations for publishing in accordance with some embodiments discussed herein.

FIG. 7 is a flowchart showing process 700 which is an example method of how files may be published in accordance with some embodiments discussed herein. Process 700 starts at 702.

In response to determining at 704 that the user would like to proceed with easy publishing, the community internet drive can be configured to provide various options to the user to save time and effort.

For example, at 706, the system may be configured to provide the user a one-click publishing option. The one-click options may include, for example, a right click option and/or menu options can be installed for the operating system or the browser, among other things. The community internet drive can either make a copy of that file within a published folder, or it can create a link such as described at 304, based on member preferences. Full copies are valuable in some circumstances because the data is more redundant and secure, but links are fast to create and use less space on the local hard drive.

In response to receiving an indication at 706 that the user has selected a user a one-click publishing option, the community internet drive can execute, at 708, the various functions needed to publish content for the user. For example, at 708, the community internet drive can be configured to set default permissions and move or link the file in the published subtree, automatically fill in descriptive information to the extent possible, generate a preview/thumbnail, notify all members of the in-group, upload to in-group members who have requested their own local copies by default, among other things.

At 710, hub management components can be notified of the publication. For example, the independent publisher using module 516 can be configured to report the action and new content to both modules 510 and 514 at the managed hub. Based on user preferences, the managed hub, using module 514, can propagate the news and notify all members of an in-group using module 526.

Returning to 706, in response to determining that the one-click publishing option was not selected, the system can be configured to enable the user to, at 712, drag and drop a file for publishing into the subtree on the local drive that was defined at 622 in FIG. 6. In different implementations, these actions can be accessed and controlled through a web browser, through an application with a custom user interface, and/or by using the operating system directly.

At 714, the system can be configured to enable the user to and/or automatically set or adjust permissions based on, for example, user preferences and/or the publishing folder's settings. In some embodiments, some or all of the permissions can be adjusted by the user at 714. In some embodiments, a plug-in or other component can enable the community internet drive to provide the user a view of the published files offered to the user by the community internet drive, which may also be used as a confirmation to the user that the publishing is completed at that moment. The independent publisher can also be configured to generate and transmit (from module 516 to module 510 and module 514) a notification of the publication, at 710, such that the newly published content can be integrated into the managed hub functionality. For example, the managed hub may let the user, in-group users and/or other users find the newly published content.

Returning to 704, in response to determining the user rather proceed with a custom or other type of non-easy publication, process 700 may proceed to 716 to identify the source within their storage system.

At 718, the system can enable the user to choose, at 718, a destination location for where it will appear on the community internet drive as part of the published subtree. The community internet drive may be configured to support multiple operating systems, for example Microsoft's Windows®, Apple Inc.'s Mac OS®, and Linux. Local disk drive and file access can be part of a browser plug-in with permissions, or part of an independent application written in Java, C++, C#, or some other language. Local file access can be written using Boost or similar libraries to achieve OS independence at compilation, or custom clients can exist at the source code level for each platform. In practice trade-offs for performance, ease of use, and reliability may lead those skilled in the art to selections of different equivalents that achieve the same result of examining the local file system.

At 720, the system can be configured to confirm the user has the proper permissions and/or other authorizations to publish at that location. For example, the system can be configured to determine at 720, among other things, that the user has ownership of the namespace the content would be published under.

In some embodiments, a determination can be made at 722 whether or not one or more symbolic links should be created for files and/or folders. For example, files and/or folders that do not exist at the mirrored location on the local drive corresponding to the published location on the community internet drive can be created as symbolic links. In some embodiments, a full copy can be made instead or in addition to a symbolic link.

When locations differ and a determination to generate a link is made at 722, independent publisher (and/or other component) can be configured to persist the data at 724 to restore that publishing between sessions.

Another publishing decision that may be made is whether to share application data at 726. The determination at 726 may be made after 724 and/or after determining at 722 not to generate a link. Application data may come from a file with an application association, such as word processing files, spreadsheet files, presentations, audio, video, and image files. The community internet drive can incorporate understanding of such file formats and applications so that some or all of the file can be streamed or published in part.

In response to determining at 726 that application data should be shared, data can be accessed at 728 based on requests and queries from the consumer, including but not limited to file chunks, document pages, copies of music and video tracks, streamed music and video tracks, video sequences, and database queries. In some embodiments, independent publishers may be configured to persist the application association that can process requests for application data. Process 700 may then proceed to 710 after 728 or after determining at 726 that application data should be shared.

After 710, process 700 may proceed to 730 and proceed to complete the publishing process. The file from the independent publishers may already be there to be discovered, but the publishing user and/or other users may want to a pass around references to that data. A determination can be made at 730 whether to create a reference.

In response to determining a reference link should be created at 730, a link may be created at 732. One of the more simple options is to generate a link as a URI. The community internet drive can be configured to use that link to retrieve the data when it is presented by an authorized user, even recovering from outages at the publisher or deletion of the original source, when copies are available. In some embodiments, process 700 may end after 732 at 734.

In some embodiments, one or more additional options may be provided to, for example, the publishing user and/or owner of the data. For example, in response to determining generation of a reference link is to be omitted at 730, a determination can be made at 736 as to whether to create an access seed to the data. If an access seed is not to be generated, process 700 may end at 734.

If an access seed is to be generated, process 700 can proceed to 738 to create one or more access seeds by combining URIs, keys, and user IDs, among other things, to grant individual access to data that would otherwise typically have higher restrictions. In some embodiments, granting individual private access to a public file may be harmless. The access seed creator can be configured to combine, at 738, reference information like the URI and the user ID within the community internet drive along with security keys, and writes them into a file. At 740, that file can be sent to the identified consumer.

Figure 8:
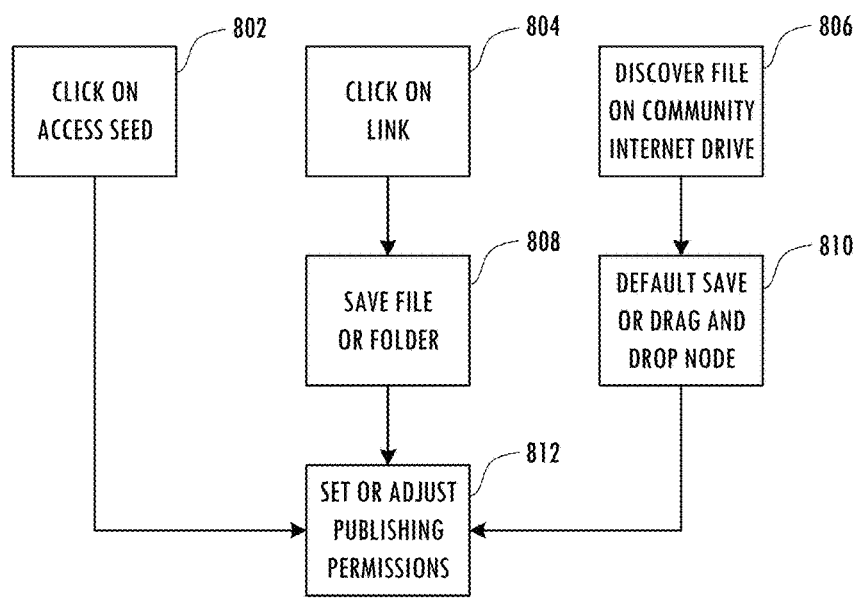
FIG. 8 shows a flowchart from the user's perspective of an example file transfer process in accordance with some embodiments discussed herein.

FIG. 8 shows an example of the user's perspective of downloading data from the community internet drive. The ease of use of combined features of the community internet drive can be a valuable aspect of some embodiments discussed herein. Users may be given three easy options for download. They can click on an access seed at 802, click on a link at 804, or, at 806, discover the file or folder on the community internet drive by browsing or searching. Opening the access seed at 802 (e.g., with a software application) starts the download automatically.

If the consumer has opened a link at 804, the consumer can evaluate descriptions and metadata to decide whether to move on to saving that file or folder locally at 808. If the destination folder already exists, the community internet drive can synchronize and patch contents rather than re-downloading data that is unchanged.

If the consumer has discovered the file at 806 by exploring the community internet drive and thus have a view of the hierarchy exposed, the consumer can save to a default location or drag and drop at 810 the file or folder where they wish. If the newly created and downloaded copy is itself published, the user can set or adjust permissions at 812, which may also occur after 802 and/or 808.

Figure 8A:
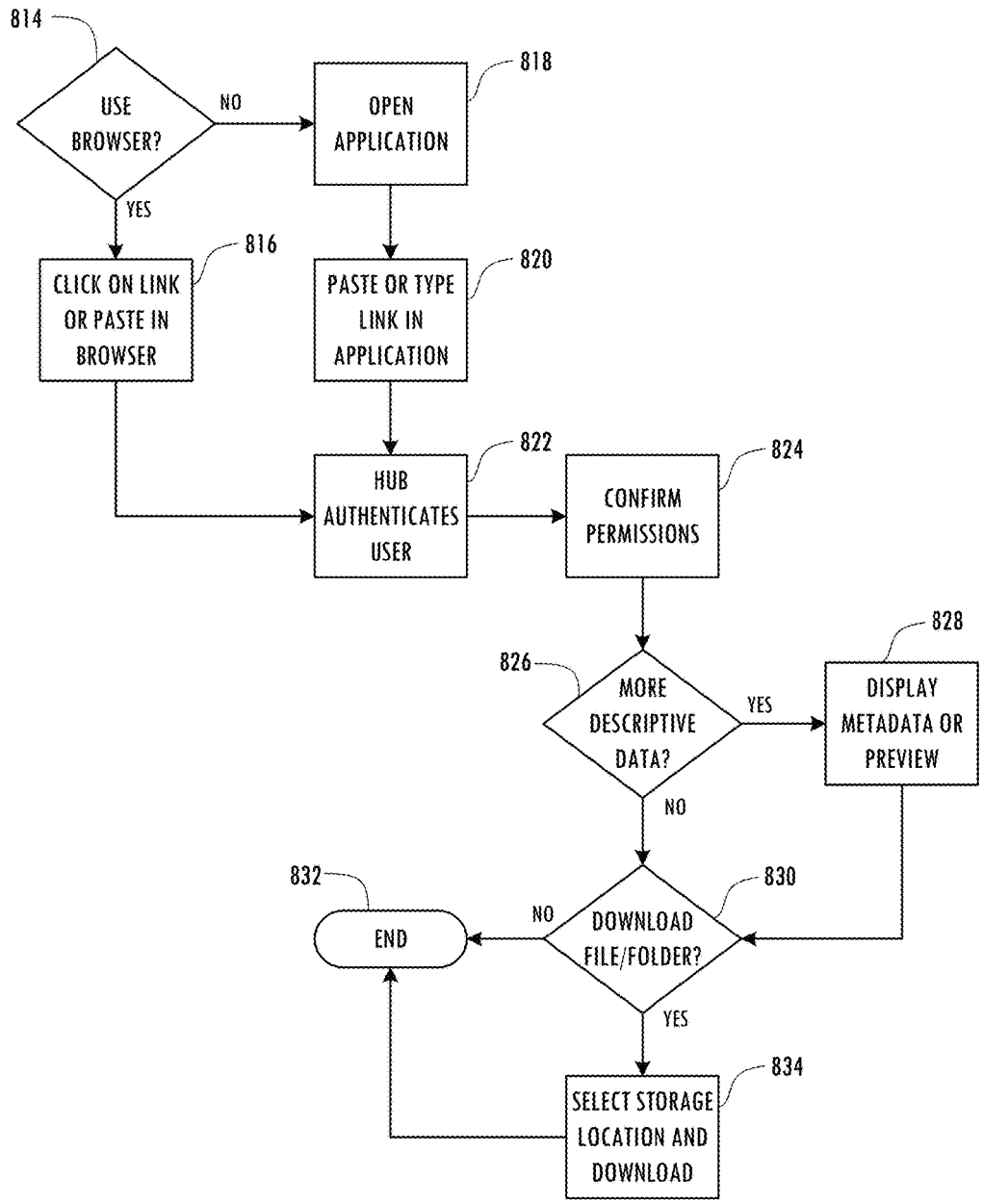
FIG. 8A shows a flowchart of an example process of opening a file as a link in accordance with some embodiments discussed herein.

FIGS. 8A-11 show example processes that can function underneath the user's perspective of FIG. 8. For example, FIG. 8A shows an example process for initiating a download from a URI link.

At 814, a determination is made whether to open the URI from a browser, including any plug-in modules. Browsers excel at ease of use and an intuitive interface, while custom applications excel when more efficiency, access to hardware, and UI complexity are necessary. If a browser is used, clicking on the link and/or pasting it in the browser at 816 can function as a request for the file from the community internet drive. In some embodiments, client application software, firmware and/or hardware that services downloads can also be configured to offer a user interface (UI) for communicating with the managed hub. Instead of using a browser, a determination can be made at 814 to open that client application at 818 and then paste or type the link at 820 into the UI.

In either case, the managed hub can be configured to authenticate the user at 822 and confirm the consumer's privileges at 824 to view the data. At this moment, the consumer is in the process of making a decision whether to download the content, and the managed hub can be configured to display any descriptive metadata it has stored.

In response to determining at 826 that the consumer desires more detail, additional descriptive metadata can be requested. The community internet drive can be configured to examine the pool of data from all the community members and select the set of copies where the consumer has access permission. The managed hub can then request more information from independent publishers in that set.

At 828, the metadata including but not limited to file size, modification and creation dates, descriptions, directory listings, number of online peers in the set, number of downloads, and ratings are displayed to the user to inform the user's decision. Any previews of the contents can also be provided at 828. These can be constructed custom by the publisher, such as pages from a book, copies of tracks of music or video, streamed tracks of music or video, lower resolution images or video, cropped pictures, or time cut sequences. Associated applications can also automatically generate and provide low resolution previews as copies or streams at 828.

In response to determining at 830 not to download the file/folder, the process ends at 832 (by, e.g., proceeding to 812 of FIG. 8). In response to determining at 830 to download the file/folder, the storage location can be selected at 834 and the file/folder downloaded. For example, the user can be provided the option to accept a default location or select the storage location on their local drive. When the storage location selected is within the subtree already published to the community internet drive, the subtree can be selected based on information already available at the hub. To download the file/folder from a web browser, a temporary copy could be cached in a temporary space. To select a storage location for a long term or larger copy, how to traverse the file system may vary based on the programming language and operating system at the community machine being used by the user. In this regard, the community internet drive can be configured to implement a multiplicity of traversal schemes, as the community internet drive can be configured to support multiple operating systems, be implemented as a web browser plug-in (e.g., with permissions), and/or be implemented as an independent application written in Java, C++, C#, and/or some other programming language. For example, in some embodiments, the community internet drive can be configured using Boost or similar libraries to achieve OS independence at compilation, and/or custom clients can exist at the source code level for each platform. In practice trade-offs for performance, ease of use, and reliability lead those skilled in the art to selections of different equivalents that achieve the same result of traversing the local file system. The process may then end at 832 (by, e.g., proceeding to 812 of FIG. 8).

Figure 8B:
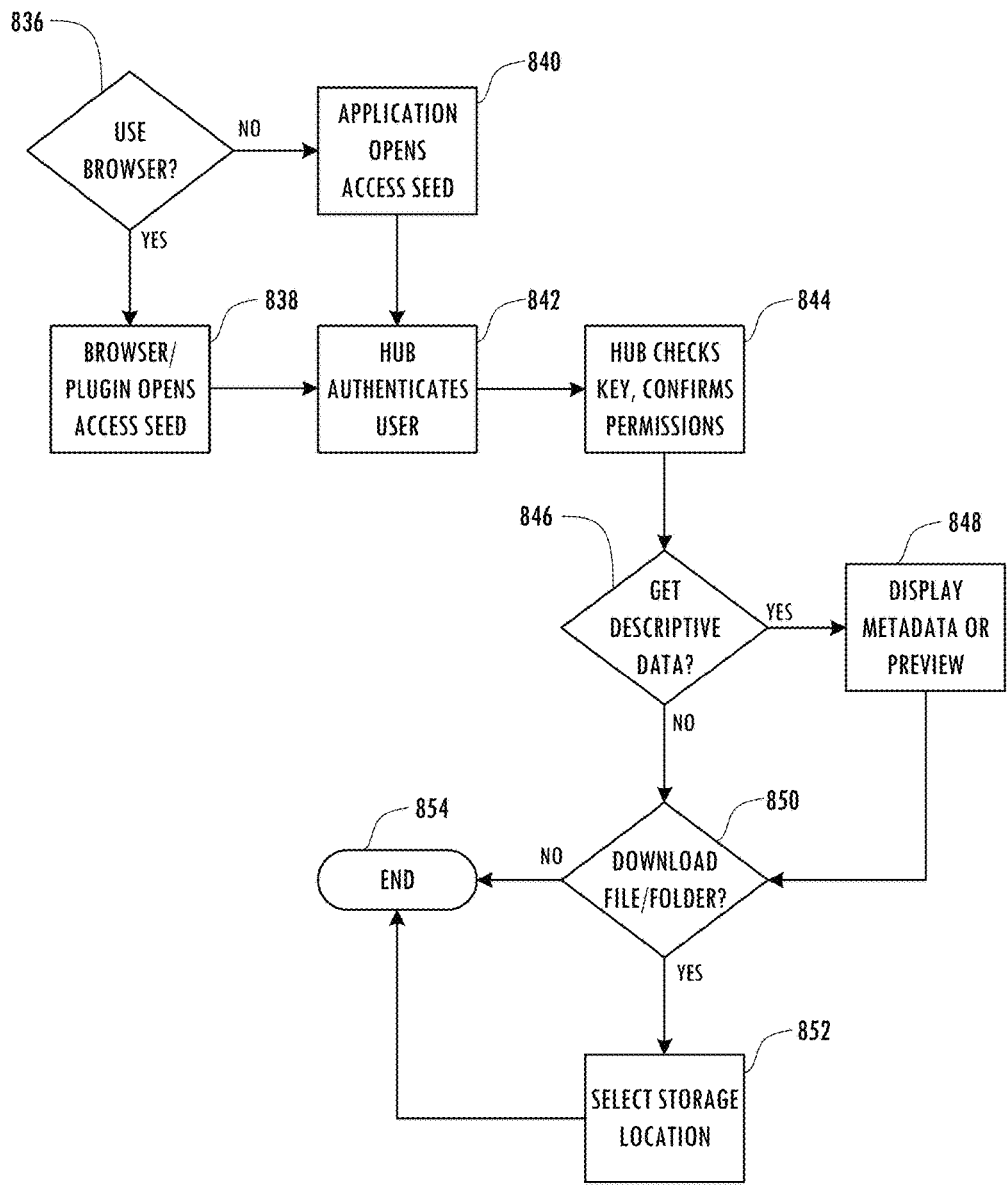
FIG. 8B shows a flowchart of an example process of opening an access seed in accordance with some embodiments discussed herein.

FIG. 8B shows an example of initiating a download from an access seed as discussed in connection with, e.g., 802 of FIG. 8. The community machine can have received the access seed from any source, including email attachments or messaging within the community internet drive.

A determination can be made at 836 as to whether to open the access seed with a browser. In response to determining at 836 that the access seed is to be opened by a web browser, the access seed may be opened at 838 using, for example, one or more plug-in modules. For example, a request for the file or folder from the community internet drive can cause a client application, that services downloads, to offer a user interface (UI) for communicating with the managed hub.

In response to determining at 836 that the access seed should be opened in a manner other than using a browser, the access seed may be opened with a client application at 840, for example. In some embodiments, application associations based on file extensions can open the access seed and application together at once.

After 838 or 840, the managed hub can be configured to authenticate the user at 842. The system can also be configured to confirm at 844 that the packaged keys are authorized to grant that particular user access to that data owned by the publisher.

Because the consumer at this moment is still in the process of making a decision whether to download the content in some instances, the system can be configured to display any descriptive metadata it has stored. In response to determining at 846 that the consumer desires more detail, additional descriptive metadata can be requested and displayed at 848. For example, the community internet drive can be configured to examine the pool of data from one or more (including all) of the community members and select the set of copies where the consumer has access permission. The system can then be configured to request more information from any of independent publishers that both hold a duplicate copy and who allow access to the downloader. The metadata displayed at 848 may include, for example, file size, modification and creation dates, descriptions, directory listings, number of online peers in the set, number of downloads, and/or ratings to aid in inform the user's decision. Any available previews of the contents can also be viewed at 848, when such previews are provided by the publisher and supported by an associated application.

In response to determining to forgo obtaining descriptive data or after displaying the data, a determination can be made at 850 as to whether to download the file/folder at 850. If so, the storage location can be selected at 852. If not, a default location can be used. If a default location is used and/or after 852, the process can end at 854 (by, e.g., proceeding to 812 of FIG. 8).

Figure 8C:
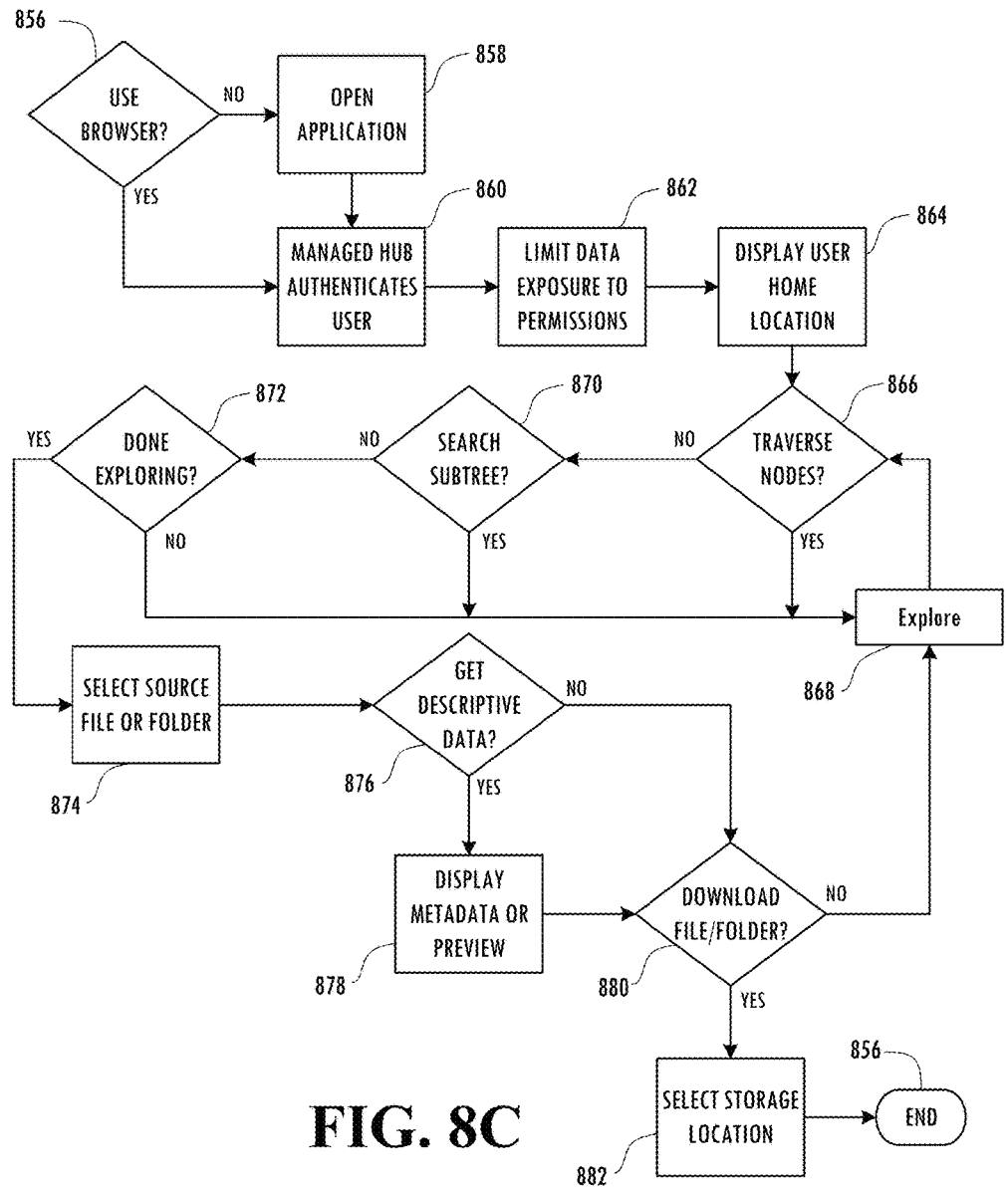
FIG. 8C shows a flowchart of an example process of browsing and searching the community internet drive in accordance with some embodiments discussed herein.

FIG. 8C shows an example of using the community internet drive to discover content for downloading as discussed in connection with 806 of FIG. 8.

At 856, a determination can be made as to whether a browser should be used to access the community internet drive. In response to determining that an application or something other than a web browser should be used, a client application, for example, can be opened at 858 to access the community internet drive.

In response to determining that a web browser should be used and/or after accessing the community internet drive via another vehicle, the system can be configured to authenticate the user at 860.

Based on the user's identity, the system can be configured, at 862, to limit the user's view to content and other data that the user has permission to access, where typically that data will be personal and private, fully public, or limited within a social in-group. At 864, the system can be configured to display the user's home location as a starting point. Each user's home location may include, for example, content the user published and/or favorite connections to content and/or members of their in-group, among other things.

From the home location, a determination can be made at 866 whether nodes should be traversed. For example, starting either from the root or from any of user's preferred connections, one or more nodes can be traversed and the various files/folders can be explored at 868.

In response to determining that nodes are not to be traversed at this time, a determination can be made at 870 as to whether a substree should be searched and/or otherwise explored. If so, one or more subtrees can be explored at 868. If not, a determination can be made at 872 whether or not the exploring should be stopped (e.g., in response to receiving a user indication that the exploring is complete). If exploring is to be continued, 868 can be executed.

In response to determining at 872 that the exploring is complete, a source file and/or folder of interest can be selected at 874. In some embodiments, 874 may be performed while the consumer is in the process of making a decision whether to download the content, and the system can determine at 876 whether or not descriptive metadata and/or other data that has been stored should be displayed.

In response to determining at 876 that descriptive data is to be displayed (e.g., in response to receiving an indication of the user's desire to view more detail), additional data can be requested and displayed at 878. For example, the community internet drive can be configured to examine the pool of data from all the community members and select the set of copies where the consumer has access permission. The system can also or instead be configured to request more information from any of independent publishers that both hold a duplicate copy and who allow access to the downloader. The metadata including but not limited to file size, modification and creation dates, descriptions, directory listings, number of online peers in the set, number of downloads, and ratings can be displayed at 878 to the user to inform their decision. Any available previews of the contents might also be presented at 878.

In response to determining descriptive data is not to be displayed or after displaying the descriptive data, a determination can be made at 880 as to whether or not a file/folder should be downloaded. If not, the user can continue to explore at 868. In some embodiments, an option may be provided enabling the process to end at any point (like other processes discussed herein).

In response to determining at 880 that a file/folder is to be downloaded, an option may be provided at 882 enabling the user to select the storage location. A default location and/or user-specified location may be selected for download. The location may be, for example, on the user's community machine's local storage device, among other places. The process may then end at 884 (by, e.g., proceeding to 810 or 812 of FIG. 8).

Figure 9:
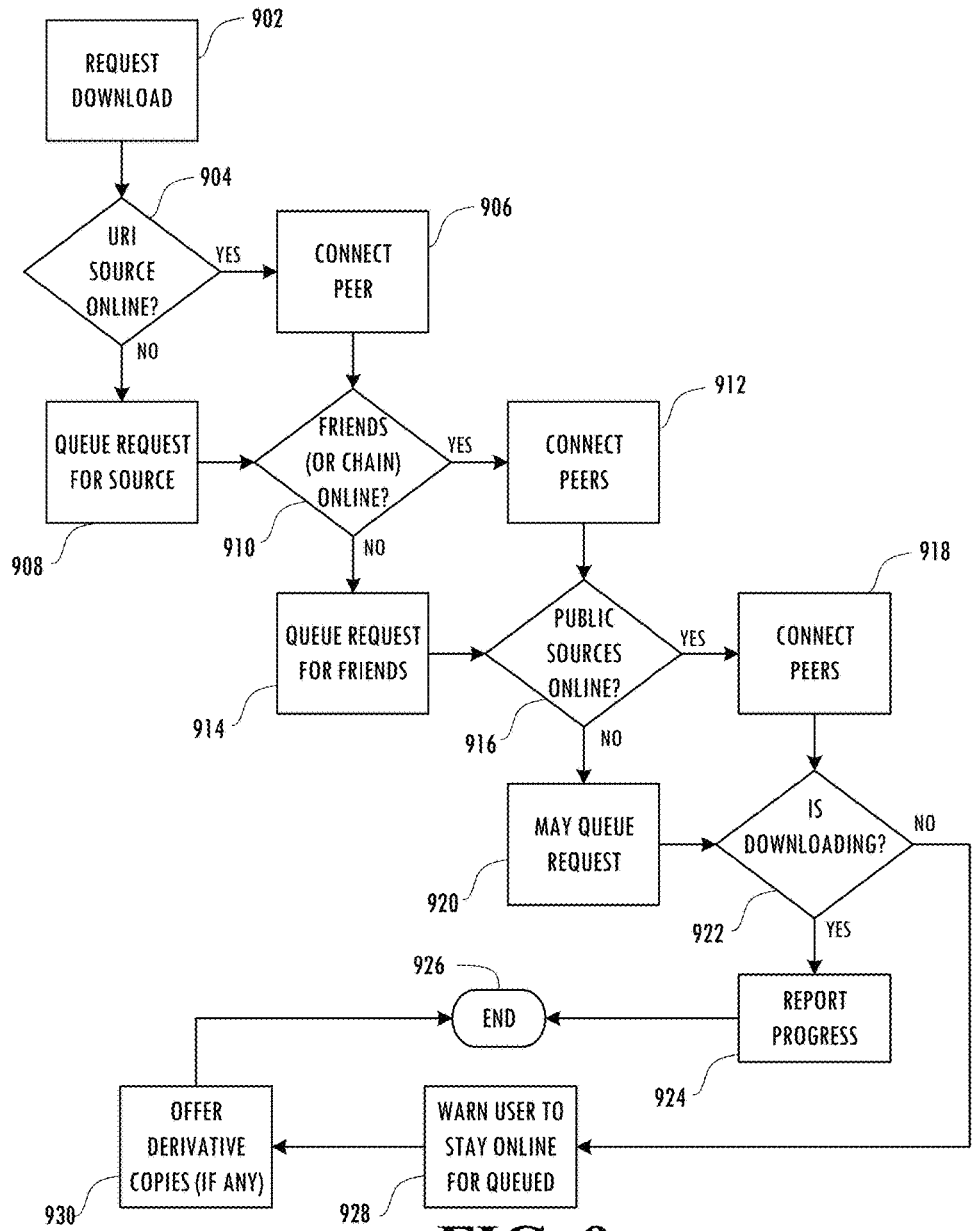
FIG. 9 shows a flowchart of an example process of a download sequence at the managed hub in accordance with some embodiments discussed herein.

FIG. 9 shows an example process of how the managed hub can configure the system to arrange the P2P servicing of a consumer's download request. Process can start at 902 by receiving a request to download a file/folder from a peer.

At 904, a determination can be made whether the first peer to contact (e.g., the peer associated with the independent publishing user referenced in the URI) is online. If so, the requesting user's community machine is connected by the system to the publishing user at 906.

Connecting peers at 906 may include sending different instructions to the requesting user (also referred to herein sometimes as the "consumer") and publishing user (also referred to herein sometimes as the "publisher"), where a duplicate host can be acting for the publisher. The machines of both the consumer and the publisher may request and/or receive IP addresses and credentials for the other machine from the managed hub. Additionally, the managed hub provides both of the machines with the file identifier. Consumers may utilize decryption and file re-assembly instructions in some or all instances, again as instructed by the managed hub. In some embodiments for reasons of privacy and security, a duplicate host may be uninformed of the encryption, decryption, and/or file splitting, among other things of the data they are uploading on command from the managed hub.

A publishing host, in some embodiments, can be given instructions for encryption and file splitting. File splitting may have any number of modes and, for example, may have two modes. When two modes are implemented, one mode can be used to reduce the size at the duplicate host, and the second can be used to add a barrier to the duplicate host snooping into the contents. Post-encryption, the system can be configured to enable some bit patterns to be removed from the data and stored on, for example, different hosts. Host recipients of the split files can be kept ignorant of each other in some embodiments, the combined data identity, any encryption, and/or whether they hold a complete file or some split, among other things.

In response to determining at 904 the URI source is not currently online, the download request can be queued at 908 for when that publishing user and/or the related machine comes back online. In some embodiments, other copies of the requested content can be searched for that may be stored on other user's community machine(s) for the publishing user.

After the requesting user's machine is connected, at 906, to a machine having the publishing user's content and/or after queuing the request at 908, a determination can be made at 910 whether there are in-group members online with permissions open for download to that consumer. In response to finding such in-group members, those in-group members can be connected at 912 (which may be the same as or similar to the functionality discussed in connection with 906). Those in-group members will then join in sharing use of their storage and bandwidth to service the download as described at modules 518 and 520, typically with a friend or family member.

If response to determining at 910 there are no in-group members online with permissions also open for download to that consumer, a download request for each of those in-group members can be queued at 914 similar to or the same as the queuing at 908.

At 916, a determination can be made as to whether any public sources are online that may contain the same data. In response to finding such a public source at 916, the public source machine can be connected at 912 (which may be the same as or similar to the functionality discussed in connection with 906).

In response to determining at 916 such a public source is not currently online, some embodiments may be configured to queue, at 920, the public sources, which were found at 916, to (also or instead) service the download. In some embodiments, whether the public sources are queued is correlated with the number of peers found at 904 and/or 910. The managed hub will make an estimate for the expected service to the consumer, basically how long the download will take, and based on other activity levels in the community internet drive plus the system load on the public uploaders, and make a determination of a fair allocation of resources and service.

At 922, a determination can be made as to whether or not the download has successfully commenced. If so, download progress is reported to the user at 924. The system, for example, can be configured to report progress to the user's community machine if the download was initiated from a browser, the application, or otherwise. The process may then end at 926.

If at 922 it is determined that the download did not successfully commence, the user can be warned at 928 to leave the community machine online to wait for a queued download. Also the user can be offered derivative copies at 930 if, for example, a publisher had a copy but since modified it, or at least changed the modification date since the data's original download. The process may then end at 926.

Figure 10:
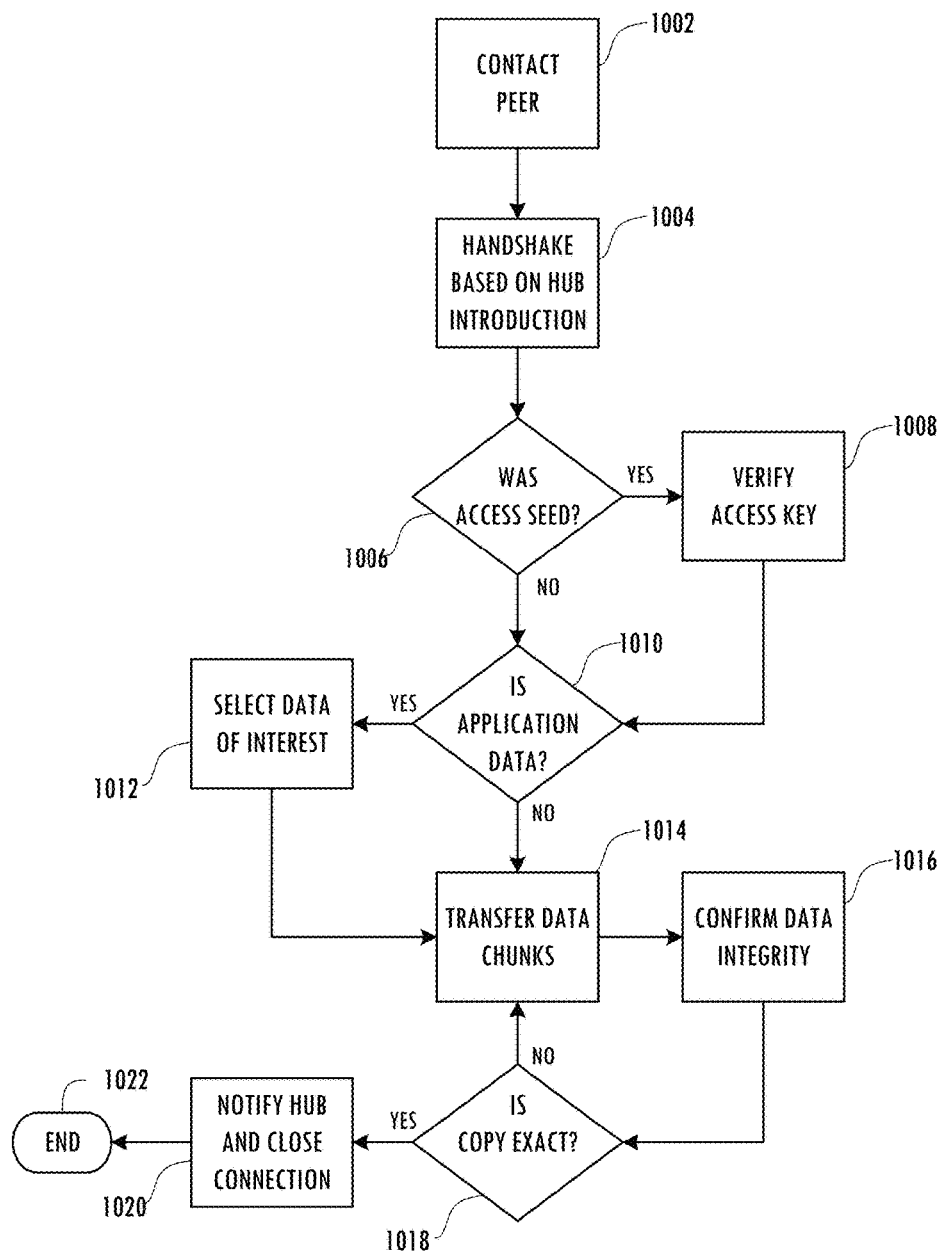
FIG. 10 shows a flowchart of an example process of the individual peer operations during a transfer in accordance with some embodiments discussed herein.

FIG. 10 shows an example of P2P communications that may happen behind FIG. 8. After the hub makes an introduction, the peers can contact each other at 1002. In some embodiments, the system may be configured such that either peer can initiate the communication without an effect on security. For example, some embodiments may be configured to protect the user identities and IP addresses except as authorized by each user.

The two peers then handshake at 1004 based on the system's introduction at 1002. Handshaking can include, for example, a determination as to whether or not the peers may have been associated with each other as mutual members of each other's in-groups, where keys and/or other identifying data was previously exchanged between the peers, or whether this is a one-time introduction authenticated at the managed hub.

At 1006, a determination can be made as to whether the contact between the peers is based on special access bundled in an access seed. As such, the execution of 1006 may serve as a third level of identification that can be made.

If so, the access seed can be verified at 1008. After 1008 and/or after a determination is made at 1006 that an access seed was not used to as a basis for the peers to contact each other, a determination can be made at 1010 as to whether application data (rather than, e.g., a complete file or folder) is being requested. As in 726 and 728, the community internet drive can parse or otherwise meaningfully examine into file formats for known application types.

In response to determining that application data is being selected, the publisher can be enabled to select the data of interest at 1012 based on, e.g., that application view of the data. Examples include but are not limited to pages in a document, copies of video or music tracks, streamed video or music tracks, and/or records from a database or an Excel file, among other things.

After 1012 and/or after determining that application data is not being requested at 1010, the peers may then agree to transfer the data, and start transferring that data in chunks at 1014. The integrity of each chunk of data can be validated at 1016. For example, each chunk can be encrypted as directed by the system for the transfer, which can have a special meaning when the receiving peer is hosting a backup or duplicate, and is never given the key for decryption. For further protection, a backup host can be missing parts of the file, even at a bit level that would interfere with the decrypting of the file should the key ever be obtained. Even though that backup host might have a partial and encrypted copy that the backup host cannot read, the system can be configured to aid the downloader to assemble a complete copy and provide the key for decryption. In some embodiments, if the user selected a file or folder (as opposed to, e.g., application data), the resulting data can be written to the local storage. As another example, when the peer is hosting a backup, the known duplicate can be written to local storage. In some embodiments, the community internet drive may be configured to implement a multiplicity of writing schemes used to execute the functionality discussed herein.

At the completion of the data transfer, the exactness of the new copy can be confirmed at 1018. Exactness verification can be included in the managed hub functionality of system when, for example, the download included hosts with only partial and/or encrypted copies of the data. This may add protection from peers masquerading for access and counterfeiting their ownership of data when they do not have rights. In response to determining the copy was not exact at 1018, 1014 can be repeated.

In response to determining at 1018 that the copy is exact, the connections can be closed and the managed hub of the system can be notified of the availability of another copy at 1020. The managed hub will associate this new copy with the original progenitor, so that future downloads can activate this peer as an identical data source for any instance or copy of that progenitor file. The process may then end at 1022.

Figure 11:
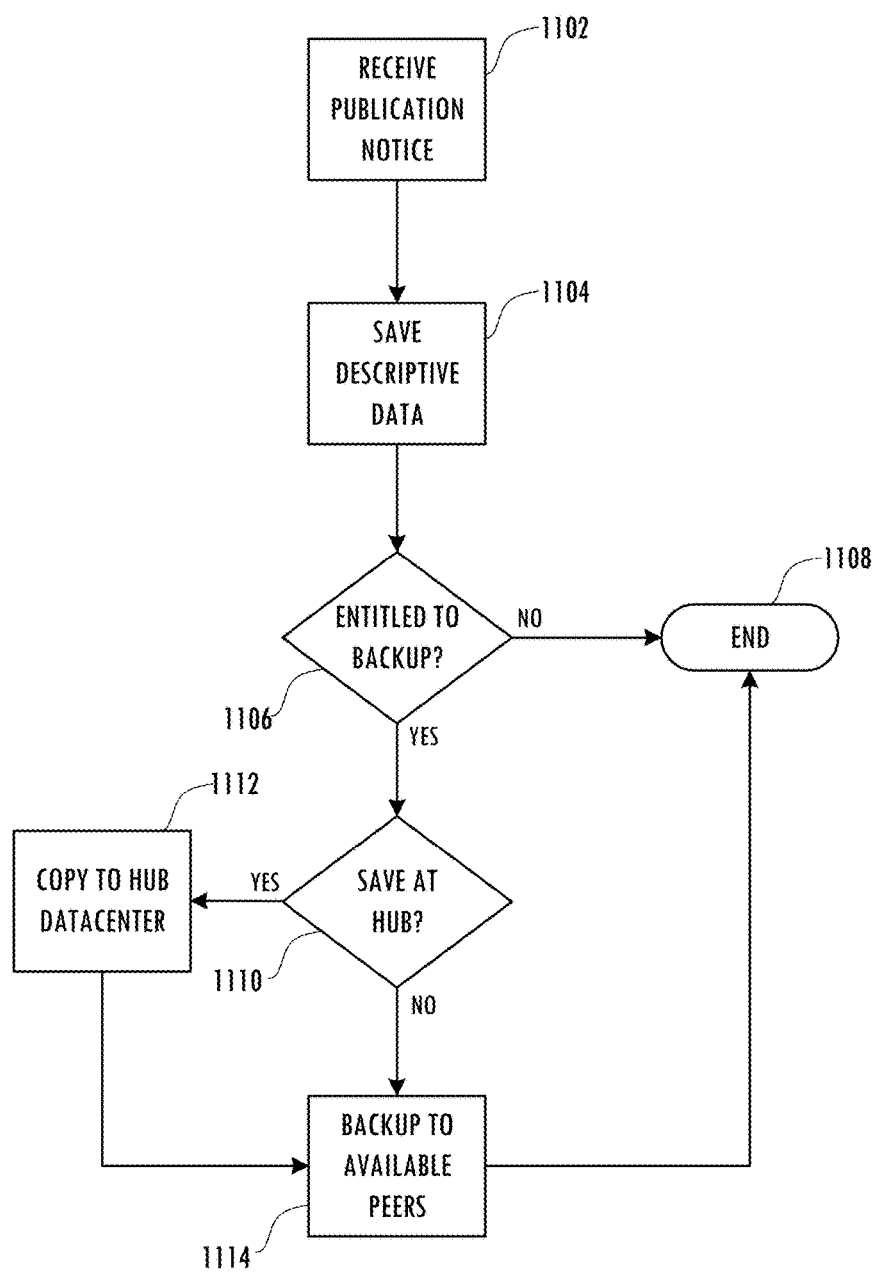
FIG. 11 shows a flowchart of an example process of server side operations for publishing in accordance with some embodiments discussed herein.

FIG. 11 shows example operations that may be performed at the managed hub when a file is published. The managed hub running on the system may be configured to receive publication notice at 1102. Receiving such notice may cause the system to make the URI a defined element of the drive, and/or the data available for access.

At 1104, the managed hub can cause the system to save the descriptive data associated with the published file, so that the published file remains discoverable when the publisher is offline. The descriptive data can also include previews of the published file in some embodiments.

At 1106, account data for the publisher can be examined to determine if the publisher is entitled to a backup and/or any other services. The determination at 1106 may be made based on publisher's level of participation in the community internet drive, any associated upgraded services, and/or the publisher's preferences. In response to determining at 1106 that the publisher is not entitled to the community internet drive backing up the publisher's data and/or performing any other services, the process may end at 1108.

In response to determining at 1106 that the publisher is entitled to an enhanced service level, such as the community internet drive storing one or more redundant copies of the publisher's data for better reliability and quality of service, a determination can be made at 1110 where to save the data.

For example, at 1110, the managed hub can cause the system to determine whether the highest reliability is appropriate by saving the data at the server machines. Various factors may be considered in making the determination at 1110, including publisher participation, publisher service upgrades, rarity of data, freshness of data, and/or data size, among other things. If, for example, the managed hub determines there is sufficient value to the data, the data can be copied at 1112 to a networked database managed by the managed hub absent the control of a peer user.

In response to determining at 1110 not to save the data a networked database or after saving the data at the networked data base at 1112, the data may be backed-up to one or more community machines under one or more peers' control. In some embodiments, for scalability and/or other reasons, the data will not be saved at the hub at 1112, and backups at 1114 can be made instead. Factors considered for determining the number of and which peers' community machines to activate for the backup of the publisher's data may include, for example, publisher participation, publisher service upgrades, rarity of data, freshness of data, data size, and/or any privacy limitations expressed by the publisher if they do not trust encryption, among other things. For example, a publisher might only allow replication of their data onto community machines associated with the publisher's identified in-group. Similarly the member hosting the duplicate as explained at module 520 is more generous in hosting data from an in-group member, who is typically a friend or family member. The process may then end at 1108. FIG. 10 for peer-to-peer communications may function the same in this case when the managed hub initiates the data transfer for creating backup copies as it did during a regular member initiated download.

As such, a number of advantages may be realized by various embodiments discussed herein. For example, the centralization of community file and data management creates a whole greater than the parts. Local hard drives and other storage can become interconnected into a vast whole. Once interconnected, the ease and efficiency for transfers, searches, and comparisons improves relative to prior systems. Multiple internal operations can be aggregated and chained into single inclusive steps for the user.

Ultimately embodiments discussed herein can improve publishing, discovery, and transferring of data through combinations of features. When a community member joins through registration, the new member may receive personal namespace (such as, e.g., through an internet URL) and file sharing functionality on the member's community machine(s). After that, the new member does not have to select and purchase a domain name, contract for content hosting, or install code to maintain a web server, FTP server, or tomcat, so that a broader population can contribute data and files. Basic publishing can be exactly as simple as drag and drop. Basic downloading can be equally as simple with drag and drop. The pool of community data can be searchable and browsable for discovery, along with announcements to an in-group of new content. Massive files, such as high definition video, can be shared beyond what can be sent with email, or that might fit on a compact disk, flash drive and/or other removable storage devices. Physical copies such as to compact disks, digital versatile disks, Blu-ray disks and/or flash drives can be obviated, and the data passes directly onto the consumer's storage (such as a hard drive or solid state drive).

Data management and user authentication provided by embodiments discussed herein can protect member identities and IP addresses when members would rather avoid sharing data with the broader public beyond their friends listed in an in-group. Because some embodiments provide for bandwidth management for performance and scalability, that scalability allows for the data variety and redundancy to create value. Because of the greater ease of use for publishing and downloading, users can link file addresses for data existing on their home drives in forums, blogs, diggs, SMS, and instant messenger traffic. Because there is tracking of copies and duplicates across the community internet drive, there is mitigation against link rot. An exactly equivalent copy can often be delivered. More consumer choice is enabled for what, when, and where to download, across a rich and browsable namespace.

In some embodiments, the familiar view of file path is meshed with the domain URL for the community internet drive. Hard drives, SSDs, and any other storage devices can be linked into one massive virtual drive across various geographical locations, such as across the planet, or to the limits of the internet and broadband communications, or to the limits set by one or more users. Files on personal storage devices can be linked and downloaded through a URL the consumer opens in the consumer's web browser. The community internet drive, or portions of it, can be integrated with the OS on the local machine to appear as a connected physical drive. Removing the barriers and gaps makes the entire system more intuitive for the user. As such, in some embodiments, the disjoint pieces become one coherent whole.

Many modifications and other embodiments of the inventions set forth herein will come to mind to one skilled in the art to which these inventions pertain having the benefit of the teachings presented in the foregoing descriptions and the associated drawings. For example, while the discussion herein often references examples based on reading and storing data, the participating members of the community internet drive may also manage editing access to certain of their data and storage without departing from the spirit of the invention. Therefore, it is to be understood that the inventions are not to be limited to the specific embodiments specifically disclosed herein and that modifications and other embodiments are intended to be included within the scope of the appended claims. Although specific terms are employed herein, they are used in a generic and descriptive sense only and not for purposes of limitation.

That which is claimed:

1. An apparatus for managing a peer-based community internet drive, the apparatus comprising at least one processor and at least one memory including computer program code, the at least one memory and the computer program code configured to, with the at least one processor, cause the apparatus to:
    receive, from a first client machine, a request to be included in the community internet drive;
    generate configuration data;
    transmit the configuration data to the first client machine, wherein the configuration data is executable by the first client machine to partition a local storage device of the first client machine into a private portion and a shared portion, wherein the shared portion is included in the community internet drive and the private portion is excluded from the community internet drive;
    receive, from the first client machine, a first user profile associated with a first user;
    receive, from the first client machine, a request for control of a first namespace, wherein the first namespace provides a reference for access to first content stored in the shared portion of the local storage drive of the first client machine; wherein the first content is associated with the first user; and
    provide control of the first namespace to the first client machine, wherein control of the first namespace enables the first client machine to specify allowed access to the first content within the first namespace, and wherein control of the first namespace is required to publish any content under the namespace.

2. The apparatus of claim 1, further caused to:
    receive, from the first client machine, identification of one or more additional users to be included in a first in-group associated with the first user profile.

3. The apparatus of claim 2, further caused to:
    receive, from a second client machine, a request to access the first namespace; and
    upon determining that a second user accessing the second client machine is in the first in-group, enable the second client machine to access the first content via the first namespace, the second user associated with a second user profile.

4. The apparatus of claim 1 wherein the first content is encrypted.

5. The apparatus of claim 2, further caused to transmit notification to users in the first in-group when the first namespace is updated.

6. The apparatus of claim 2, further caused to:
    store a portion of the first content in a shared portion of a second client machine, wherein the portion of the first content is only accessible to those users in the first in-group.

7. The apparatus of claim 1, further caused to create a first uniform resource identifier for at least one instance of the first content.

8. The apparatus of claim 1, further caused to:
    receive encrypted second content from the first client machine;
    stored the encrypted second content in the community internet drive;
    receive a key from a third client machine, wherein the first client machine provided the key to the third client machine; and
    upon verifying the key, enable the third client machine to decrypt and access the encrypted second content.

9. The apparatus of claim 2, further caused to:
    receive, from the second client machine, identification of one or more additional users to be included in a second in-group associated with the second user profile;
    receive, from the second client machine, a request for control of a second namespace, wherein the second namespace provides a reference for access to third content stored in the community internet drive; wherein the third content is associated with the second user;
    provide control of the second namespace to the second client machine, wherein control of the second namespace enables the second client machine to specify allowed access to the third content within the second namespace, and wherein control of the second namespace is required to publish any content under the second namespace.

10. The apparatus of claim 1, further caused to one of restrict access or provide continuous access to the first content when the first client machine is offline.

11. A computer program product comprising a non-transitory computer readable medium having computer program instructions stored therein, said instructions when executed by a processor manage a community internet drive by causing the computer program product to:
receive, from a first client machine, a request to be included in the community internet drive;
generate configuration data;
transmit the configuration data to the first client machine, wherein the configuration data is executable by the first client machine to partition a local storage device of the first client machine into a private portion and a shared portion, wherein the shared portion is included in the community internet drive and the private portion is excluded from the community internet drive;
receive, from the first client machine, a first user profile associated with a first user;
receive, from the first client machine, a request for control of a first namespace, wherein the first namespace provides a reference for access to first content stored in the shared portion of the local storage drive of the first client machine; wherein the first content is associated with the first user; and
provide control of the first namespace to the first client machine, wherein control of the first namespace enables the first client machine to specify allowed access to the first content within the first namespace, and wherein control of the first namespace is required to publish any content under the namespace.

12. The computer program product of claim 11, further caused to:
receive, from the first client machine, identification of one or more additional users to be included in a first in-group associated with the first user profile.

13. The computer program product of claim 12, further caused to:
receive, from a second client machine, a request to access the first namespace; and
upon determining that a second user accessing the second client machine is in the first in-group, enable the second client machine to access the first content via the first namespace, the second user associated with a second user profile.

14. The computer program product of claim 11 wherein the first content is encrypted.

15. The computer program product of claim 12, further caused to transmit notifications to users in the first in-group when the first namespace is updated.

16. The computer program product of claim 12, further caused to:
store a portion of the first content in a shared portion of a second client machine, wherein the portion of the first content is only accessible to those users in the first in-group.

17. The computer program product of claim 11, further caused to create a first uniform resource identifier for at least one instance of the first content.

18. The computer program product of claim 11, further caused to:
receive encrypted second content from the first client machine;
stored the encrypted second content in the community internet drive;
receive a key from a third client machine, wherein the first client machine provided the key to the third client machine; and
upon verifying the key, enable the third client machine to decrypt and access the encrypted second content.

19. The computer program product of claim 13, further caused to:
receive, from the second client machine, identification of one or more additional users to be included in a second in-group associated with the second user profile;
receive, from the second client machine, a request for control of a second namespace, wherein the second namespace provides a reference for access to third content stored in the community internet drive; wherein the third content is associated with the second user;
provide control of the second namespace to the second client machine, wherein control of the second namespace enables the second client machine to specify allowed access to the third content within the second namespace, and wherein control of the second namespace is required to publish any content under the second namespace.

20. The computer program product of claim 11, further caused to one of restrict access or provide continuous access to the first content when the first client machine is offline.

21. The computer program product of claim 11, further caused to:
receive, from a fourth client machine, the first user profile associated with the first user; and
provide control of the first namespace to the fourth client machine.

* * * * *